(12) United States Patent
Barnstable et al.

(10) Patent No.: US 11,892,112 B2
(45) Date of Patent: Feb. 6, 2024

(54) BORE PRESSURIZED PIPE HANDLING SYSTEMS AND METHODS

(71) Applicant: Trinity Bay Equipment Holdings, LLC, Houston, TX (US)

(72) Inventors: Christopher David Barnstable, Williston, ND (US); Shawn Thomas Berry, Mont Belivieu, TX (US); Alejandro Estrella, Midland, TX (US); John Paul Leger, Baytown, TX (US); Matthew Douglas Lusk, Williamsport, PA (US); Alexander Lee Winn, Spring, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/828,717

(22) Filed: May 31, 2022

(65) Prior Publication Data
US 2022/0403970 A1    Dec. 22, 2022

Related U.S. Application Data

(60) Provisional application No. 63/195,308, filed on Jun. 1, 2021.

(51) Int. Cl.
*F16L 55/134* (2006.01)
*F16L 1/06* (2006.01)
*F16L 1/024* (2006.01)

(52) U.S. Cl.
CPC ............ *F16L 55/134* (2013.01); *F16L 1/024* (2013.01); *F16L 1/06* (2013.01); *F16L 1/065* (2013.01)

(58) Field of Classification Search
CPC ..... F16L 55/12; F16L 55/1283; F16L 55/132; F16L 55/134; F16L 1/024; F16L 1/06;
(Continued)

(56) References Cited

U.S. PATENT DOCUMENTS 1,221,733 A * 4/1917 Henderson ............ F16L 55/134
                                                                220/232
3,091,259 A * 5/1963 Alessio ..................... F16K 7/10
                                                                 138/90
(Continued)

FOREIGN PATENT DOCUMENTS

WO     WO 96/16790 A1 *  6/1996

*Primary Examiner* — Sunil Singh
(74) *Attorney, Agent, or Firm* — Conrad J. Hsu

(57) ABSTRACT

Techniques for implementing and/or operating a pipe handling system that includes an inboard bore plug assembly and an outboard bore plug assembly, which facilitate plugging a pipe bore in a flexible pipe. The inboard bore plug assembly includes a first inflatable plug having a first inflatable bladder that defines a first fluid cavity and a first inflation port opening and a first inflation fluid port secured within the first inflation port opening. The outboard bore plug assembly includes a second inflatable plug having a second inflatable bladder that defines a second fluid cavity, a second inflation port opening, and a bore port opening, a second inflation fluid port secured within the second inflation port opening, and a bore fluid port secured in the bore port opening to enable the pipe bore in the flexible pipe to be pressurized to an elevated fluid pressure.

18 Claims, 10 Drawing Sheets

(58) Field of Classification Search
CPC .. F16L 1/065; E21B 33/1243; E21B 33/1246; E21B 19/22
USPC ............. 138/93, 97, 89; 15/104.05, 104.062
See application file for complete search history.

(56) References Cited

U.S. PATENT DOCUMENTS

| | | | | |
|---|---|---|---|---|
| 4,072,015 | A | * | 2/1978 | Morrell ................. E21D 15/483 |
| | | | | 405/289 |
| 4,083,384 | A | * | 4/1978 | Horne ...................... E03F 9/00 |
| | | | | 134/167 C |
| 4,101,067 | A | * | 7/1978 | Sloan .................. B23K 31/027 |
| | | | | 219/136 |
| 4,482,076 | A | * | 11/1984 | Wentzell ............. G21C 13/028 |
| | | | | 277/921 |
| 4,531,550 | A | * | 7/1985 | Gartner ............... F16L 55/1283 |
| | | | | 138/89 |
| 4,678,370 | A | * | 7/1987 | Allen ........................ E03F 3/06 |
| | | | | 405/184.2 |
| 5,368,809 | A | | 11/1994 | Steketee, Jr. |
| 10,392,896 | B1 | | 8/2019 | VanderLans et al. |
| 10,739,255 | B1 | | 8/2020 | Kirchnavy |
| 2006/0086400 | A1 | | 4/2006 | Beebe et al. |
| 2017/0009929 | A1 | * | 1/2017 | Acker ................. F16L 55/1612 |

* cited by examiner

BORE PRESSURIZED PIPE HANDLING SYSTEMS AND METHODS

CROSS-REFERENCE

The present disclosure claims priority to and benefit of U.S. Provisional Application No. 63/195,308, entitled "BORE PRESSURIZED PIPE HANDLING SYSTEMS AND METHODS," filed Jun. 1, 2021, which is incorporated herein by reference in its entirety for all purposes.

BACKGROUND

The present disclosure generally relates to pipeline systems and, more particularly, to techniques for pressurizing the pipe bore of flexible pipe to facilitate reducing the likelihood of flexible pipe, which has inadvertent deformation (e.g., kinking and/or flattening), being deployed in a pipeline system.

Pipeline systems are often used to convey (e.g., transport) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system generally includes pipe (e.g., one or more pipe segments) in addition to pipe (e.g., midline and/or end) fittings, which are used to connect a pipe segment to another pipeline component, such as another pipe fitting, another pipe segment, a fluid source, and/or a fluid destination. Generally, a pipe includes tubing, which defines (e.g., encloses) a pipe bore that provides a primary fluid conveyance (e.g., flow) path through the pipe. More specifically, the tubing of a pipe may be implemented to facilitate isolating (e.g., insulating) fluid being conveyed within its pipe bore from environmental conditions external to the pipe, for example, to reduce the likelihood of the conveyed (e.g., bore) fluid being lost to the external environmental conditions and/or the external environmental conditions contaminating the conveyed fluid (e.g., clean and/or potable water).

In fact, in some instances, flexible pipe may be formed (e.g., wound, wrapped, and/or spooled) into a pipe coil having a hollow interior channel, a first circular base, and a second (e.g., opposite) circular base, for example, for transportation and/or storage before at least a segment of the flexible pipe is deployed from the pipe coil into a pipeline system. In particular, in such instances, flexible pipe may be deployed from a pipe coil into a pipeline system at least in part by unwinding (e.g., unwrapping and/or unspooling) the flexible pipe from the pipe coil. However, unwinding flexible pipe from a pipe coil and, thus, deploying the flexible pipe from the pipe coil directly into a pipeline system may result in the tubing and, thus, the pipe bore of the flexible pipe inadvertently being deformed (e.g., kinked), for example, due to the flexible pipe tubing having to unbend (e.g., straighten) as it is unwound (e.g., unwrapped and/or unspooled) from the pipe coil, which, at least in some instances, may inadvertently limit operational efficiency and/or operational reliability of the pipeline system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe handling system includes an inboard bore plug assembly, which facilitates plugging an inboard end of a pipe bore in a flexible pipe that is formed into a pipe coil, and an outboard bore plug assembly, which facilitates plugging an outboard end of the pipe bore in the flexible pipe. The inboard bore plug assembly includes a first inflatable plug having a first inflatable bladder that defines a first fluid cavity and a first inflation port opening that opens to the first fluid cavity and a first inflation fluid port secured within the first inflation port opening such that the first inflation fluid port opens to the first fluid cavity. The outboard bore plug assembly includes a second inflatable plug having a second inflatable bladder that defines a second fluid cavity, a second inflation port opening that opens to the second fluid cavity, and a bore port opening that extends through the second inflatable bladder, a second inflation fluid port secured within the second inflation port opening such that the second inflation fluid port opens to the second fluid cavity, and a bore fluid port secured in the bore port opening such that the bore fluid port extends through the second inflatable plug to enable the pipe bore in the flexible pipe to be pressurized to an elevated fluid pressure at least while the flexible pipe is being unwound from the pipe coil.

In another embodiment, a method of handling flexible pipe that is formed into a pipe coil includes plugging an inboard end of a pipe bore of the flexible pipe using an inboard bore plug assembly at least in part by supplying inflation fluid to a first inflatable bladder in a first inflatable plug of the inboard bore plug assembly to transition the first inflatable bladder from a first less inflated state to a first more inflated state such that a first outer surface of the first inflatable bladder is circumferentially compressed against an inner surface of tubing of the flexible pipe, plugging an outboard end of the pipe bore of the flexible pipe using an outboard bore plug assembly at least in part by supplying inflation fluid to a second inflatable bladder in a second inflatable plug of the outboard bore plug assembly to transition the second inflatable bladder from a second less inflated state to a second more inflated state such that a second outer surface of the second inflatable bladder is circumferentially compressed against the inner surface of the tubing of the flexible pipe, in which the second inflatable bladder defines a bore port opening and the outboard bore plug assembly includes a bore fluid port secured in the bore port opening such that the bore port opening extends through the second inflatable bladder, and supplying bore fluid to the pipe bore of the flexible pipe via the bore fluid port that extends through the second inflatable bladder of the outboard bore plug assembly to facilitate maintaining fluid pressure within the pipe bore elevated at least while the flexible pipe is being unwound from the pipe coil.

In another embodiment, a bore plug assembly includes an inflatable plug and a plug securement mechanism. The inflatable plug includes an inflatable bladder that defines a fluid cavity and an inflation port opening that opens to the fluid cavity and an inflation fluid port secured within the inflation port opening in the inflatable bladder such that the inflation fluid port opens to the fluid cavity to enable the inflatable bladder to be inflated to facilitate plugging an end of a pipe bore in a flexible pipe. The plug securement mechanism includes a threaded fastener that is to be secured in a fastener opening that is formed through tubing of the flexible pipe such that the threaded fastener extends into the pipe bore of the flexible pipe behind the inflatable plug to facilitate blocking the inflatable plug from inadvertently being pushed out of the end of the pipe bore when fluid pressure within the pipe bore is elevated.

DETAILED DESCRIPTION

Figure 1:
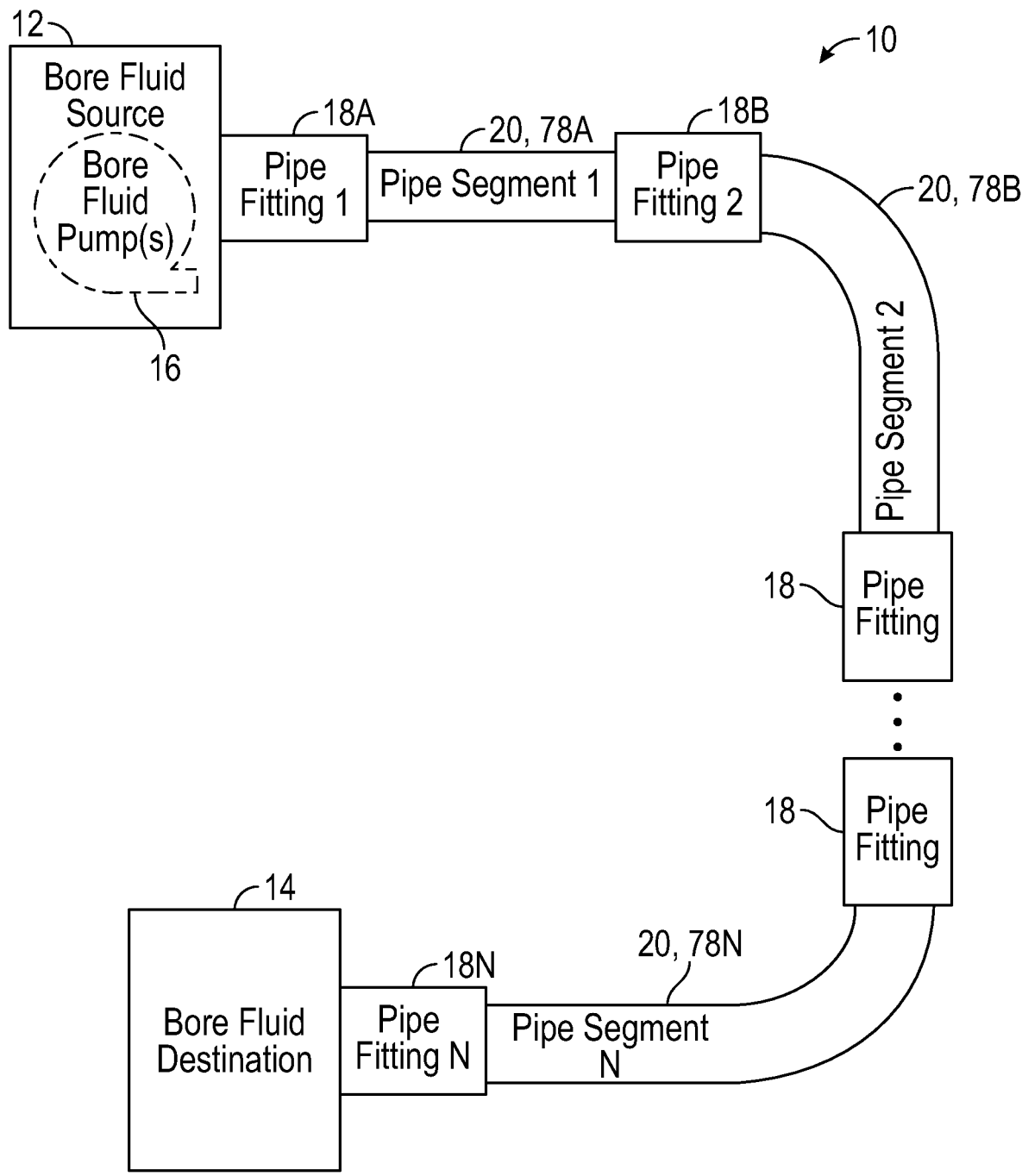
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure relates to pipeline systems, which generally include pipe (e.g., one or more pipe segments) secured and sealed in pipe fittings, such as a midline pipe fitting and/or a pipe end fitting. In fact, in some instances, flexible pipe may be formed (e.g., wound wrapped, and/or spooled) into a pipe coil having a hollow interior channel, a first circular base, and a second (e.g., opposite) circular base, for example, for transportation and/or storage before at least a segment of the flexible pipe is deployed from the pipe coil into a pipeline system. Accordingly, in such instances, flexible pipe may be deployed from a pipe coil into a pipeline system at least in part by unwinding (e.g., unwrapping and/or unspooling) the flexible pipe from the pipe coil. However, unwinding flexible pipe from a pipe coil and, thus, deploying the flexible pipe from the pipe coil directly into a pipeline system may result in the tubing and, thus, the pipe bore of the flexible pipe inadvertently being deformed (e.g., kinked), for example, due to the flexible pipe tubing having to unbend (e.g., straighten) as it is unwound (e.g., unwrapped and/or unspooled) from the pipe coil, which, at least in some instances, may inadvertently limit operational efficiency and/or operational reliability of the pipeline system.

Accordingly, to facilitate improving pipeline operational efficiency and/or pipeline operational reliability, the present disclosure provides techniques for implementing and/or operating a pipe handling (e.g., deployment and/or transport) system to facilitate reducing the likelihood of inadvertently deformed (e.g., kinked and/or flattened) flexible pipe being deployed in a pipeline system. As will be described in more detail below, to facilitate deploying flexible pipe from a pipe coil, the pipe coil may generally be loaded on pipe handling (e.g., deployment) equipment in a pipe handling system, such as a pipe handling (e.g., deployment and/or transport) vehicle (e.g., trailer), a pipe deployment cradle frame, or a pipe deployment A-frame, for example, along with a pipe drum on which the pipe coil is disposed (e.g., wound, wrapped, and/or spooled). Additionally, to facilitate rotating a pipe coil relative to pipe handling equipment and, thus, unwinding flexible pipe from the pipe coil, a pipe handling system generally includes a pipe attachment that is to be secured to an outboard (e.g., free and/or outer) end of the flexible pipe, for example, to facilitate anchoring the outboard end of the flexible pipe in place to enable the flexible pipe to be unwound from the pipe coil at least in part by moving (e.g., driving or towing) the pipe handling equipment and, thus, the pipe coil away from the pipe attachment and, thus, the outboard end of the flexible pipe or, alternatively, to facilitate securing pulling equipment, such as a bulldozer or a tow truck, to the outboard end of the flexible pipe to enable the pulling equipment to unwind flexible pipe from the pipe coil at least in part by moving (e.g., pulling) the pipe attachment and, thus, the outboard end of the flexible pipe away from the pipe handling equipment and, thus, the pipe coil.

To facilitate reducing the likelihood of flexible pipe inadvertently kinking (e.g., deforming) as it is being unwound from a pipe coil, while the flexible pipe is being unwound, a pipe handling system may hold the pipe bore of the flexible pipe at an elevated fluid pressure. Merely as an illustrative non-limiting example, a target fluid pressure to which a pipe bore is to be elevated may be greater than one atmosphere, between 14.7-43.8 pounds per square inch, greater than 43.8 pounds per square inch, between 20-50 pounds per square inch, greater than or equal to forty pounds per square inch, greater than or equal to fifty pounds per square inch, or greater than or equal to sixty pounds per square inch. In any case, to facilitate holding the pipe bore of a flexible pipe at an elevated fluid pressure, a pipe handling system may generally include a pair of bore plug assemblies—namely an outboard bore plug assembly, which is to be used to plug (e.g., seal) an outboard (e.g., free and/or outer) end of the pipe bore, and an inboard bore plug assembly, which is to be used to plug an inboard (e.g., inner) end of the pipe bore.

In some embodiments, a bore plug assembly in a pipe handling system may include a mechanical plug. In particular, in some such embodiments, a mechanical plug in a bore plug assembly may include a threaded plug shaft, an end plate secured to an end of the threaded plug shaft, an activation plate disposed circumferentially around the threaded plug shaft, and a plug gasket, which is disposed circumferentially around the threaded plug shaft between the end plate and the activation plate and has a female tapered inner surface that can slide along a male tapered surface of the end plate and/or the activation plate. Accordingly, in such embodiments, an open end of the pipe bore in a flexible pipe may be plugged at least in part by inserting a mechanical plug into the pipe bore and, subsequently, tightening a nut on the threaded shaft of the mechanical plug to push the activation plate and, thus, the plug gasket of the mechanical plug toward the end plate of the mechanical plug, thereby causing the female tapered inner surface of the plug gasket to slide up the male taper surface of the end plate and/or the activation plate and, thus, the outer surface of the plug gasket to expand radially outward such that it is compressed against the inner surface of the tubing of the flexible pipe.

Since the outer surface of a plug gasket in a mechanical plug generally expands radially outward in a uniform manner, a bore plug assembly that includes a mechanical plug may be suitable for plugging on open end of a pipe bore that has a circular shape. However, at least in some instances, at least a portion of the tubing and, thus, the pipe bore of a flexible pipe may be inadvertently flattened (e.g., deformed), for example, due to gravity pulling down on the flexible pipe and/or the flexible pipe having to be bent such that the outer diameter of each pipe wrap layer is larger than its inner diameter to form the flexible pipe into a pipe coil. In other words, in such instances, the pipe bore of a flexible pipe may have an oval shape.

To facilitate plugging an open end of a pipe bore that may potentially have a non-circular (e.g., oval) shape, in other embodiments, a bore plug assembly in a pipe handling system may include an inflatable (e.g., pneumatic) plug, which has an inflatable (e.g., fluid) bladder that defines a fluid cavity. Accordingly, in such embodiments, supplying (e.g., injecting and/or pumping) inflation fluid, such as liquid and/or gas, into a fluid cavity in an inflatable plug may transition (e.g., inflate) its inflatable bladder from a less inflated (e.g., uninflated or partially inflated) state to a more (e.g., fully) inflated state such that the outer surface of the inflatable bladder expands radially outward, for example, to enable the outer surface of the inflatable bladder to be circumferentially compressed against and, thus, circumferentially engaged with the inner surface of the tubing of a flexible pipe, thereby facilitating plugging of the pipe bore defined by the flexible pipe tubing. In particular, in such embodiments, the flexibility (e.g., pliability and/or malleability) of an inflatable bladder in an inflatable plug may enable the outer surface of the inflatable bladder to expand radially outward in a non-uniform manner (e.g., in accordance with the shape of the inner surface of flexible pipe tubing), thereby enabling the inflatable plug to be suitable for plugging a pipe bore that has a non-circular shape.

In any case, in such embodiments, extracting (e.g., releasing) inflation fluid from a fluid cavity in an inflatable plug may transition its inflatable bladder from a more inflated state to a less inflated state such that the outer surface of the inflatable bladder contracts radially inward, for example, to enable the outer surface of the inflatable bladder to disengage from the inner surface of the tubing of a flexible pipe, thereby facilitating unplugging of the pipe bore defined by the flexible pipe tubing. To facilitate supplying inflation fluid to and/or extracting inflation fluid from an inflatable plug in a bore plug assembly and, thus, controlling its inflation state, in some embodiments, a pipe handling system may include an inflation fluid source (e.g., pump) and the inflatable plug may include an inflation fluid port, which opens through its inflatable bladder to its fluid cavity and can be fluidly connected to the inflation fluid source via one or more inflation fluid conduits, such as a hose.

In any case, in some instances, the elevated fluid pressure within the pipe bore of a flexible pipe may overpower the engagement between a (e.g., mechanical or inflatable) plug of a bore plug assembly and, thus, inadvertently push the plug out of the pipe bore. To facilitate reducing the likelihood of its plug inadvertently being disengaged from the tubing of a flexible pipe, in some embodiments, a bore plug assembly in a pipe handling system may additionally include a plug securement mechanism, which is to be secured to the flexible pipe tubing such that the plug securement mechanism at least partially extends into the pipe bore of the flexible pipe behind the plug. In particular, in some such embodiments, a plug securement mechanism in a bore plug assembly may include a (e.g., threaded) fastener, such as a bolt, a screw, or a pin, that is to be secured within a fastener opening in the tubing of a flexible pipe, a (e.g., threaded) retainer, such as a nut or a cotter pin, that is to be secured to an (e.g., threaded) end of a fastener to facilitate securing the fastener within a corresponding fastener opening, a shackle that is to be secured to the flexible pipe tubing via a fastener, a support plate that is to be secured between a fastener and a plug of the bore plug assembly, or any combination thereof.

In any case, after the ends of the pipe bore of a flexible pipe are plugged, to facilitate reducing the likelihood of the flexible pipe having inadvertent deformation (e.g., kinking and/or flattening) when deployed in a pipeline system and, thus, inadvertently limiting operational efficiency and/or operational reliability of the pipeline system, a pipe handling system may elevate the fluid pressure within the pipe bore at least in part by supplying (e.g., injecting and/or pumping) bore fluid, such as liquid and/or gas, into the pipe bore. To facilitate supplying bore fluid to the pipe bore of a flexible pipe, a pipe handling system may generally include a bore pressurization fluid source (e.g., pump) and a bore fluid port, which can open to the pipe bore as well as being fluidly connected to the bore pressurization fluid source via one or more bore fluid conduits, such as a hose. In particular, in some embodiments, a bore fluid port in a pipe handling system may be secured in a bore port opening that is formed through the tubing of a flexible pipe such that it opens to the pipe bore of the flexible pipe and, thus, separate (e.g., distinct) from the bore plug assemblies in the pipe handling system.

However, in other embodiments, a bore fluid port may be included in a (e.g., outboard) bore plug assembly of a pipe handling system. For example, in some such embodiments, an inflatable bladder in an inflatable plug of a bore plug assembly may be donut shaped to define a bore port opening that extends therethrough. In such embodiments, a bore fluid port of the bore plug assembly may be secured within the bore port opening to enable the bore fluid port to be fluidly connected to the pipe bore of a flexible pipe through the inflatable bladder.

In any case, pressurizing the pipe bore of a flexible pipe to an elevated fluid pressure may increase the resistance the flexible pipe exerts against inward deformation. Accordingly, to facilitate reducing the likelihood of flexible pipe kinking (e.g., deforming), a pipe handling system may hold the fluid pressure within the pipe bore of the flexible pipe at an elevated fluid pressure at least while the flexible pipe is being unwound from a corresponding pipe coil, for example, for deployment in a pipeline system. In fact, to facilitate reducing the likelihood of inadvertently flattened (e.g., deformed) flexible pipe being deployed in a pipeline system, in some embodiments, a pipe handling system may hold the fluid pressure within the pipe bore of a flexible pipe at an elevated fluid pressure even before flexible pipe is to be deployed from a pipe coil, for example, while the pipe coil is in storage and/or being transported (e.g., over the road to a pipeline system). In any case, in this manner, as will be described in more detail below, the present disclosure provides techniques for implementing and/or operating a pipe handling system, which includes a pair of bore plug assemblies, to facilitate deploying flexible pipe from a pipe coil into a pipeline system with a reduced likelihood of the flexible pipe having inadvertent deformation (e.g., kinking and/or flattening), which, at least in some instances, may facilitate improving operational efficiency and/or operational reliability of the pipeline system.

To help illustrate, an example of a pipeline system 10 is shown in FIG. 1. As in the depicted example, a pipeline system 10 may generally be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, a pipeline system 10 may generally facilitate transporting (e.g., conveying) fluid, such as gas and/or liquid, from a bore fluid source 12 to a bore fluid destination 14. In fact, in some embodiments, a pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to a bore fluid destination 14, in some embodiments, a bore fluid source 12 in a pipeline system 10 may include one or more bore fluid pumps 16, which inject (e.g., pump and/or supply) fluid from the bore fluid source 12 into a bore of the pipeline system 10. However, it should be appreciated that the depicted example is merely intended to be illustrative and not limiting. In particular, in other embodiments, a bore fluid pump 16 may not be included at a bore fluid source 12, for example, when fluid flow through the bore of a corresponding pipeline system 10 is produced by gravity. Additionally or alternatively, in other embodiments, a bore fluid pumps 16 may be included in a pipeline system 10 and/or at a bore fluid destination 14.

In any case, to facilitate transporting fluid from a bore fluid source 12 to a bore fluid destination 14, a pipeline system 10 generally include pipe fittings 18 and pipe 20, which is implemented using one or more pipe segments 78. For example, the depicted pipeline system 10 includes a first pipe segment 78A, a second pipe segment 78B, and an Nth pipe segment 78N. Additionally, the depicted pipeline system 10 includes a first pipe (e.g., end) fitting 18A, which connects the bore fluid source 12 to the first pipe segment 78A, a second pipe (e.g., midline) fitting 18B, which connects the first pipe segment 78A to the second pipe segment 78B, and an Nth pipe (e.g., end) fitting 18N, which connects the Nth pipe segment 78N to the bore fluid destination 14.

However, it should again be appreciated that the depicted example is merely intended to be illustrative and not limiting. In particular, in other embodiments, a pipeline system 10 may include fewer than four (e.g., three or two) pipe fittings 18 or more than four (e.g., five, six, or more) pipe fittings 18. Additionally or alternatively, in other embodiments, a pipeline system 10 may include fewer than three (e.g., two or one) pipe segments 78 or more than three (e.g., four, five, or more) pipe segment 78.

In any case, as described above, a pipe 20 generally includes tubing that may be used to convey (e.g., transfer and/or transport) water, gas, oil, and/or any other suitable type of fluid. The tubing of a pipe 20 may be made of any suitable type of material, such as plastic, metal, and/or a composite (e.g., fiber-reinforced composite) material. In fact, as will be described in more detail below, in some embodiments, the tubing of a pipe 20 may include multiple different tubing layers. For example, the tubing of a pipe 20 may include a first high-density polyethylene (e.g., internal corrosion protection) layer, one or more intermediate (e.g., metal, composite, and/or reinforcement) layers external to the first high-density polyethylene layer, and a second high-density polyethylene (e.g., external corrosion protection) layer external to the one or more intermediate layers.

Additionally, as in the depicted example, one or more (e.g., second and/or Nth) pipe segments 78 in a pipeline system 10 may be curved. To facilitate implementing a curve in a pipe 20, in some embodiments, the pipe 20 may be flexible, for example, such that the pipe 20 can be formed (e.g., wound, wrapped, and/or spooled) into a pipe coil (e.g., during transport and/or before deployment of the pipe 20). In other words, in some embodiments, pipe 20 in the pipeline system 10 may be flexible pipe 20, such as bonded flexible pipe, unbonded flexible pipe, flexible composite pipe (FCP), thermoplastic composite pipe (TCP), or reinforced thermoplastic pipe (RTP). In fact, at least in some instances, increasing the flexibility of a flexible pipe 20 may facilitate improving deployment efficiency of a pipeline system 10, for example, by obviating a curved (e.g., elbow) pipe fitting 18 and/or enabling the flexible pipe 20 to be transported to the pipeline system 10, deployed in the pipeline system 10, or both using a tighter pipe coil.

To facilitate improving pipe flexibility, in some embodiments, the tubing of a flexible pipe 20 that defines (e.g., encloses) its pipe bore may additionally define free space (e.g., one or more gaps) devoid of solid material within its annulus. In fact, in some embodiments, free space defined within the tubing of a flexible pipe 20 may run (e.g., span) the length of the flexible pipe 20 and, thus, define (e.g., enclose) a fluid conduit (e.g., free space) in the annulus of the tubing, which is separate from the pipe bore. In other words, in such embodiments, fluid may flow through a flexible pipe 20 via its pipe bore, free space (e.g., gaps and/or one or more fluid conduits) defined within its tubing annulus, or both.

Figure 2:
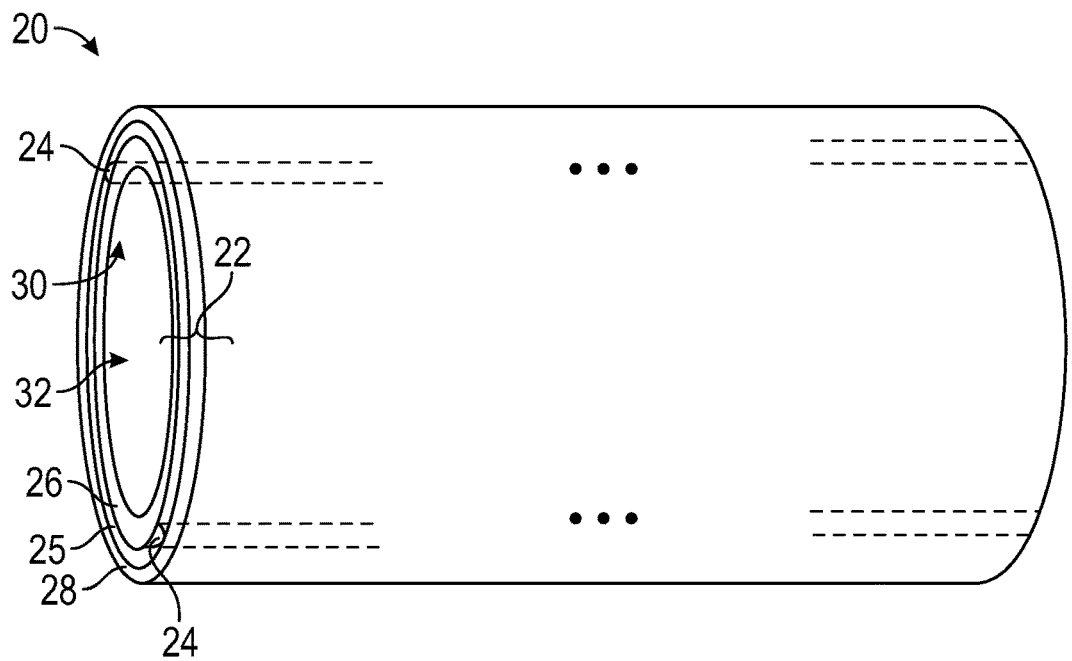
FIG. 2 is a side view of an example of a pipe that includes tubing that defines a pipe bore as well as fluid conduits within a tubing annulus, in accordance with an embodiment of the present disclosure.

To help illustrate, an example of a flexible pipe 20, which includes tubing 22 with fluid conduits (e.g., free space) 24 defined in its annulus 25, is shown in FIG. 2. As depicted, the flexible pipe tubing 22 has multiple tubing layers including an inner barrier (e.g., liner) layer 26 and an outer barrier (e.g., shield and/or sheath) layer 28. In some embodiments, the inner barrier layer 26 and/or the outer barrier layer 28 of the flexible pipe tubing 22 may formed from composite material and/or plastic, such as high-density polyethylene (HDPE), raised temperature polyethylene (PE-RT), crosslinked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to all spoolable pipe body structures including, but not limited to, unbonded reinforced thermoplastic pipes, bonded reinforced thermoplastic pipes, and single-layer or multi-layer plastic pipes. In any case, as depicted, an inner surface 30 of the flexible pipe tubing 22 defines (e.g., encloses) a pipe bore 32 through which fluid can flow, for example, to facilitate transporting fluid from a bore fluid source 12 to a bore fluid destination 14.

Additionally, as depicted, the annulus 25 of the flexible pipe tubing 22 is defined between its inner barrier layer 26 and its outer barrier layer 28. As will be described in more detail below, the tubing annulus 25 may include one or more intermediate layers. Furthermore, as depicted, fluid conduits (e.g., free space and/or gaps) 24 running along the length of the flexible pipe 20 are defined (e.g., enclosed) in the tubing annulus 25. As described above, a fluid conduit 24 in the tubing annulus 25 of a flexible pipe 20 may be devoid of solid material. As such, flexible pipe tubing 22 that includes one or more fluid conduits 24 defined in its annulus 25 may include less solid material and, thus, exert less resistance to flexure, for example, as compared to solid (e.g., rigid) pipe tubing 22 and/or pipe tubing 22 that does not include fluid conduits 24 defined therein. Moreover, to facilitate further improving pipe flexibility, in some embodiments, one or more tubing layers in a flexible pipe 20 may be unbonded from one or more other tubing layers and, thus, the flexible pipe 20 may be an unbonded pipe.

However, it should be appreciated that the depicted example is merely intended to be illustrative and not limiting. In particular, in other embodiments, a flexible pipe 20 may include fewer than two (e.g., one) or more that two (e.g., three, four, or more) fluid conduits 24 defined in its tubing annulus 25. Additionally, in other embodiments, a fluid conduit 24 defined in the tubing annulus 25 of a flexible pipe 20 may run non-parallel to the pipe bore 32 of the flexible pipe 20, for example, such that the fluid conduit 24 is skewed relative to the axial extent (e.g., longitudinal axis) of the flexible pipe 20.

Figure 3:
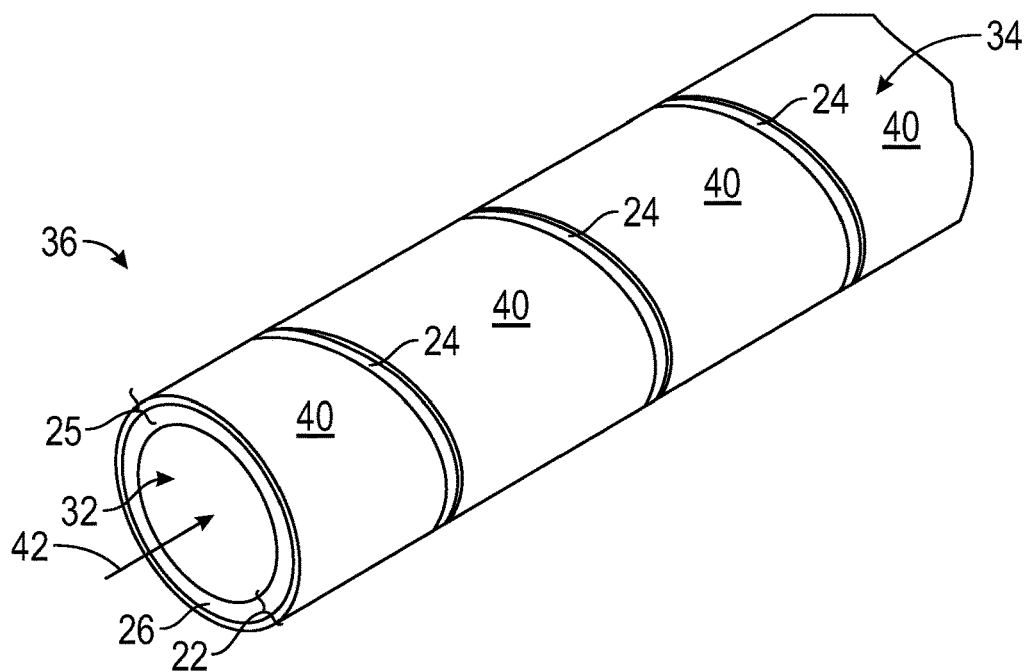
FIG. 3 is a perspective view of an example of a portion of a pipe that includes a helically shaped fluid conduit defined within its tubing annulus, in accordance with an embodiment of the present disclosure.

To help illustrate, an example of a portion 36 of a flexible pipe 20, which includes an inner barrier layer 26 and an intermediate layer 34 included in the annulus 25 of its pipe tubing 22, is shown in FIG. 3. In some embodiments, one or more intermediate layers 34 of the flexible pipe tubing 22 may formed from composite material and/or metal, such as carbon steel, stainless steel, duplex stainless steel, super duplex stainless steel, or any combination thereof. In other words, at least in some such embodiments, an intermediate layer 34 of the flexible pipe tubing 22 may be formed using electrically conductive material, which, at least in some instances, may enable communication of electrical (e.g., sensor and/or control) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a (e.g., metal, steel, and/or composite) material strip around the inner barrier layer 26 at a non-zero lay angle (e.g., fifty-two degrees) relative to the longitudinal extent 42 of the pipe bore 32. In any case, as depicted, the resulting fluid conduit 24 runs helically along the flexible pipe 20, for example, such that the fluid conduit 24 is skewed fifty-two degrees relative to the longitudinal extent 42 of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of a flexible pipe 20 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that free space is left between adjacent windings to implement one or more corresponding fluid conduits 24 in the tubing annulus 25 of the flexible pipe 20.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34. In any case, as described above, in some instances, a flexible pipe 20 may be formed (e.g., wound, wrapped, and/or spooled) into a pipe coil having a hollow interior channel, a first circular base, and a second (e.g., opposite) circular base, for example, for transportation and/or storage before at least a segment 78 of the flexible pipe 20 is deployed from the pipe coil into a pipeline system 10.

Figure 4:
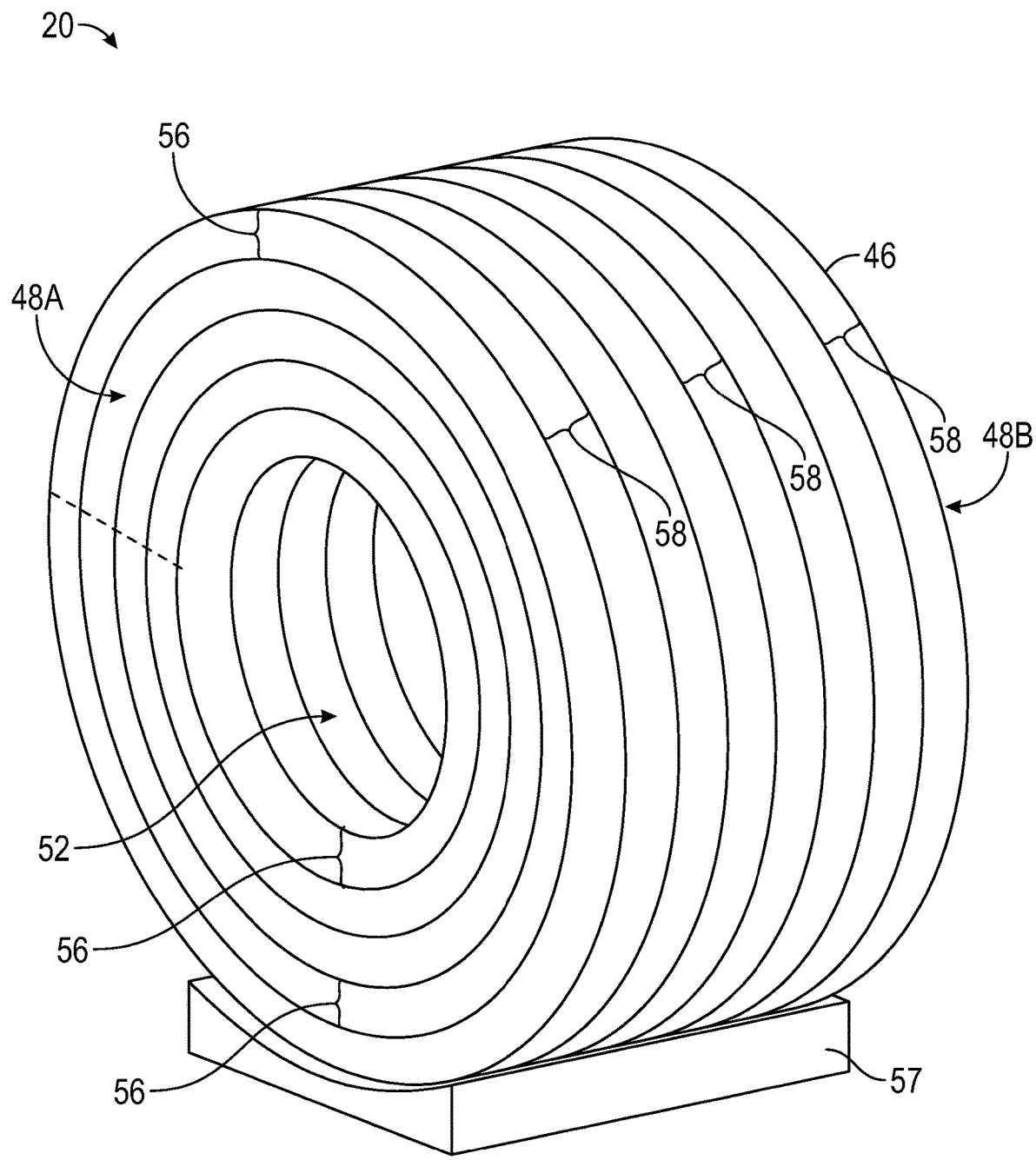
FIG. 4 is a perspective view of flexible pipe formed into a pipe coil, in accordance with an embodiment of the present disclosure.

To help illustrate, an example of flexible pipe 20, which is formed into a pipe coil 46, is shown in FIG. 4. As depicted, a pipe coil 46 may generally be formed to include a first circular base 48A, a second (e.g., opposite) circular base 48B, and a hollow interior channel 52 through the pipe coil 46.

However, it should be appreciated that the depicted example is merely intended to be illustrative and not limiting. In particular, in other embodiments, a pipe coil 46 may be formed to include more than five (e.g., six, seven, or more) pipe wrap layers 56 or fewer than five (e.g., three, two, or one) pipe wrap layers 56. Additionally or alternatively, in other embodiments, a pipe wrap layer 56 in a pipe coil 46 may be formed to include more than seven (e.g., eight, nine, or more) pipe wraps 58 or fewer than seven (e.g., six, five, or fewer) pipe wraps 58.

In any case, in the depicted example, the pipe coil 46 is disposed on a pipe skid 57. Although somewhat obfuscated from view, in the depicted example, the pipe skid 57 has a curved (e.g., rounded and/or concave) upper surface to facilitate reducing the likelihood of the pipe skid 57 inadvertently deforming the pipe coil 46.

However, it should again be appreciated that the depicted example is merely intended to be illustrative and not limiting. In particular, in other embodiments, a pipe coil 46 may not be disposed within a pipe skid 57, for example, instead being disposed directly on the ground or another type of structure. Additionally, as described above, a pipe coil 46 may be loaded on pipe handling equipment in a pipe handling system to facilitate deploying flexible pipe 20 from the pipe coil 46 into a pipeline system 10 and/or transporting the pipe coil 46, for example, over the road to the pipeline system 10.

Figure 5:
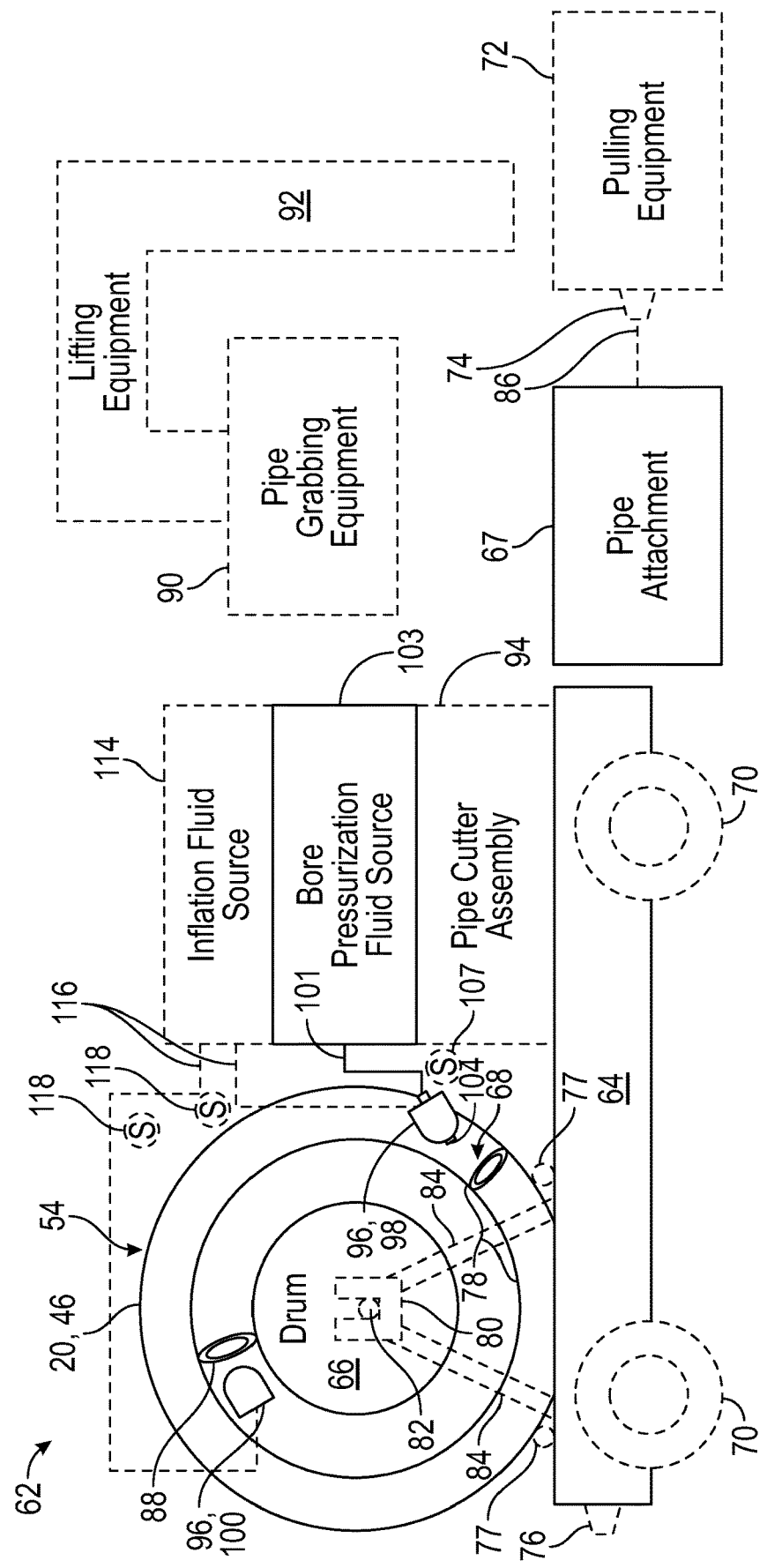
FIG. 5 is a perspective view of an example of a pipe handling system that can be used to facilitate deploying flexible pipe from a pipe coil into a pipeline system and/or transporting the pipe coil, in accordance with an embodiment of the present disclosure.

To help illustrate, an example of a pipe handling (e.g., deployment and/or transport) system 62, which includes an example of pipe handling (e.g., deployment and/or transport) equipment 64, is shown in FIG. 5. In particular, as depicted, a pipe drum 66 and a flexible pipe 20, which is formed (e.g., spooled, wound, and/or wrapped) into a pipe coil 46 that is disposed on the pipe drum 66, are loaded on the pipe handling equipment 64. In some embodiments, the pipe drum 66 may be an independent pipe drum 66. However, in other embodiments, the pipe drum 66 may be included in a pipe reel that includes reel flanges on either side of the pipe drum 66.

In any case, as depicted, to facilitate deploying flexible pipe 20 from a pipe coil 46 into a pipeline system 10, a pipe handling system 62 generally includes a pipe attachment 67, which is to be secured to an outboard (e.g., outer and/or free) end 68 of the flexible pipe 20. Additionally, in some embodiments, pipe handling equipment 64 in a pipe handling system 62 may be a pipe handling vehicle (e.g., trailer) and, thus, include vehicle wheels 70. Furthermore, in such embodiments, a pipe attachment 67 may be a pipe anchor, which is to be secured to the outboard end 68 of a flexible pipe 20 to facilitate holding (e.g., anchoring) the outboard end 68 of the flexible pipe 20 in place. Accordingly, in such embodiments, a pipe handling system 62 may unwind flexible pipe 20 from a pipe coil 46, which is loaded on a pipe handling vehicle in the pipe handling system 62, at least in part by securing a pipe anchor to the outboard end 68 of the flexible pipe 20 and moving (e.g., driving or pulling) the pipe handling vehicle and, thus, the pipe coil 46 away from the pipe anchor and, thus, the outboard end 68 of the flexible pipe 20.

In particular, in some such embodiments, a pipe handling vehicle in a pipe handling system 62 may be self-propelled and, thus, drive itself away from a corresponding pipe anchor. However, in other such embodiments, a pipe handling vehicle in a pipe handling system 62 may be a pipe handling trailer and, thus, not self-propelled. Accordingly, to facilitate moving a pipe handling trailer away from a corresponding pipe anchor, in such embodiments, a pipe handling system 62 may additionally include pulling equipment 72, such as a bulldozer or a tow truck, which includes a hitch assembly 74 that can interlock with a tongue assembly 76 on the pipe handling trailer to enable the pulling equipment 72 to move (e.g., pull and/or tow) the pipe handling trailer.

However, in other embodiments, pipe handling equipment 64 in a pipe handling system 62 may generally be stationary while being used to facilitate deploying flexible pipe 20 from a pipe coil 46 loaded thereon and, thus, not include vehicle wheels 70. In particular, in some such embodiments, stationary pipe handling equipment 64 in a pipe handling system 62 may be a pipe deployment cradle frame and, thus, include rollers 77, which can engage an outer surface 54 of a pipe coil 46 to facilitate rotating the pipe coil 46 relative to the pipe deployment cradle frame and, thus, unwinding flexible pipe 20 from the pipe coil 46. Alternatively, in other such embodiments, stationary pipe handling equipment 64 in a pipe handling system 62 may be a pipe deployment A-frame and, thus, include shaft hubs 80, which interface (e.g., interlocks) with drum shafts 82 of a pipe drum 66 to enable the pipe drum 66 and, thus, a corresponding pipe coil 46 to rotate relative to the pipe deployment A-frame, and support arms 84, which secure the shaft hubs 80 to the remainder of the pipe deployment A-frame.

In any case, to facilitate deploying flexible pipe 20 from a pipe coil 46 that is loaded on stationary pipe handling equipment 64, a pipe attachment 67 in a pipe handling system 62 may be a pipe pull head, which is to be secured to an outboard end 68 of the flexible pipe 20 to enable the outboard end 68 of the flexible pipe 20 to be pulled away from the stationary pipe handling equipment 64 and, thus, the pipe coil 46. To facilitate moving (e.g., pulling and/or towing) a pipe pull head, in such embodiments, a pipe handling system 62 may additionally include pulling equipment 72, such as a bulldozer or a tow truck, that can be secured to the pipe pull head. In particular, to enable pulling equipment 72 to move a pipe pull head, in some such embodiments, the pipe pull head may be secured to a hitch assembly 74 on the pulling equipment 72 via one or more pulling cables 86.

In any case, in some instances, the entire length of a flexible pipe 20, which is formed into a pipe coil 46, may be continuously deployed (e.g., unwound, unwrapped, and/or unspooled) from the pipe coil 46 into a pipeline system 10. In other words, in such instances, an inboard (e.g., inner) end 88 of a flexible pipe 20 may be unwound from a corresponding pipe drum 66, thereby freeing the inboard end 88 of the flexible pipe 20 from corresponding pipe handling equipment 64. To facilitate reducing the likelihood of the inboard end 88 of a flexible pipe 20 unwinding (e.g., springing back) from a corresponding pipe drum 66 in an uncontrolled manner, in some embodiments, a pipe handling system 62 may additionally include pipe grabbing equipment 90, such as a pipe gripper or pipe grabber, which can be used to grab onto flexible pipe 20 before the flexible pipe 20 is completely unwound from the pipe drum 66, for example, ten feet or fifteen feet away from the inboard end 88 of the flexible pipe 20. Furthermore, to facilitate moving pipe grabbing equipment 90 such that the pipe grabbing equipment 90 can grab onto a flexible pipe 20, in some such embodiments, a pipe handling system 62 may additionally include lifting equipment 92, such as a crane, an excavator, a backhoe, or a trackhoe, secured to the pipe grabbing equipment 90.

However, in other instances, only a segment (e.g., portion and/or section) 78 of a flexible pipe 20, which is formed into a pipe coil 46, may be deployed in a pipeline system 10 at one time. To facilitate deploying a segment 78 of a flexible pipe 20 from a pipe coil 46 into a pipeline system 10, in some embodiments, a pipe handling system 62 may additionally include a pipe cutter assembly 94. In particular, a pipe cutter assembly 94 in a pipe handling system 62 may generally include a cutting blade, which can be selectively engaged with the tubing 22 of a flexible pipe 20 to facilitate cutting a segment 78 of the flexible pipe 20, which has been unwound from a corresponding pipe coil 46, off from a remainder of the flexible pipe 20.

In any case, a pipe handling system 62 may generally deploy flexible pipe 20 from a pipe coil 46, which is loaded on pipe handling equipment 64 in the pipe handling system 62, into a pipeline system 10 at least in part by rotating the pipe coil 46 relative to the pipe handling equipment 64 to unwind (e.g., unwrap and/or unspool) more of the flexible pipe 20 from the pipe coil 46. However, at least in some instances, unwinding flexible pipe 20 from a pipe coil 46 may result in one or more kinks (e.g., deformations) inadvertently being produced in the flexible pipe 20, for example, due to the flexible pipe 20 having to unbend (e.g., straighten) as it is unwound from the pipe coil 46. Moreover, at least in some instances, a flexible pipe 20 may inadvertently flatten (e.g., deform), for example, due to gravity pulling down in the flexible pipe 20 and/or the flexible pipe 20 having to be bent such that the outer diameter of each pipe wrap layer 56 is larger than its inner diameter to form the flexible pipe 20 into a pipe coil 46. In any case, a deploying flexible pipe 20 that is inadvertently deformed (e.g., kinked and/or flattened) in a pipeline system 10 may inadvertently limit operational efficiency and/or operational reliability of the pipeline system 10, for example, due to the inadvertent deformation inadvertently changing the size and/or shape of the pipe bore 32 in the flexible pipe such that the pipe bore 32 inadvertently limits the flow rate of fluid therethrough and/or due to the inadvertent deformation weakening the tubing 22 of the flexible pipe 20 and, thus, increasing the likelihood of a breach forming through the flexible pipe tubing 22.

To facilitate reducing the likelihood that inadvertently deformed (e.g., kinked and/or flattened) flexible pipe 20 will be deployed in a pipeline system 10 and, thus, improving the operational reliability and/or the operational efficiency of the pipeline system 10, a pipe handling system 62 may hold the pipe bore 32 of the flexible pipe 20 at an elevated fluid pressure. In particular, to facilitate reducing the likelihood that inadvertently kinked flexible pipe 20 will be deployed in a pipeline system 10, a pipe handling system 62 may hold the pipe bore 32 of a flexible pipe 20 at an elevated fluid pressure at least while the flexible pipe 20 is being unwound from a pipe coil 46 for deployment in a pipeline system 10. Additionally or alternatively, to facilitate reducing the likelihood that inadvertently flattened flexible pipe 20 will deployed in a pipeline system 10, a pipe handling system 62 may hold the pipe bore 32 of a pipe coil 46 at an elevated fluid pressure while the pipe coil 46 is in storage and/or being transported, for example, over the road to the pipeline system 10 via a pipe handling vehicle (e.g., trailer).

In any case, as depicted, to facilitate elevating the fluid pressure within a pipe bore 32 in a pipe coil 46, a pipe handling system 62 generally includes bore plug assemblies 96—namely an outboard (e.g., outer and/or first) bore plug assembly 98, which is to be used to plug an outboard (e.g., outer, free, and/or first) end 68 of the pipe bore 32, and an inboard (e.g., inner and/or second) bore plug assembly 100, which is to be used to plug an inboard (e.g., inner and/or second) end 88 of the pipe bore 32. Additionally, to facilitate supplying bore fluid to the pipe bore 32 of a flexible pipe 20 and, thus, elevating the fluid pressure within the pipe bore 32, as depicted, a pipe handling system 62 generally includes a bore pressurization fluid source (e.g., pump) 103, which is fluidly connected to a bore fluid port 104 that can open to the pipe bore 32 of the flexible pipe 20 via one or more bore fluid conduits 101, such as a hose. In particular, in some embodiments, a bore fluid port 104 in a pipe handling system 62 may be secured within a bore port opening, which is formed through the tubing 22 of a flexible pipe 20 such that it opens to the pipe bore 32 of the flexible pipe 20. However, as in the depicted example, in other embodiments, a bore fluid port 104 in a pipe handling system 62 may open through a (e.g., outboard) bore plug assembly 96 in the pipe handling system 62.

In any case, in some embodiments, a pipe handling system 62 may elevate the fluid pressure within the pipe bore 32 of a flexible pipe 20 to a target fluid pressure. For example, in some embodiments, a target fluid pressure for a pipe bore 32 may be greater than one atmosphere, between 14.7-43.8 pounds per square inch, greater than 43.8 pounds per square inch, between 20-50 pounds per square inch, greater than or equal to forty pounds per square inch, greater than or equal to fifty pounds per square inch, or greater than or equal to sixty pounds per square inch. In fact, in some such embodiments, a pipe handling system 62 may adaptively adjust a target fluid pressure for a pipe bore 32. For example, in some such embodiments, a pipe bore 32 in a pipe coil 46 may have a first target fluid pressure (e.g., between 14.7-43.8 pounds per square inch) while the pipe coil 46 being transported over the road and a second (e.g., different, lower, or higher) target fluid pressure while flexible pipe 20 is being unwound from the pipe coil 46, for example, for deployment in a pipeline system 10. As in the depicted example, to facilitate controlling the fluid pressure within the pipe bore 32 of a flexible pipe 20, in some embodiments, a pipe handling system 62 may include a bore fluid pressure sensor 107 fluidly connected to the pipe bore 32 of the flexible pipe 20, for example, between a bore fluid port 104 and a bore pressurization fluid source 103.

In any case, as described above, in some embodiments, a bore plug assembly 96 in a pipe handling system 62 may include a mechanical plug. In particular, in some such embodiments, a mechanical plug in a bore plug assembly 96 may include a threaded plug shaft, an end plate secured to an end of the threaded plug shaft, an activation plate disposed circumferentially around the threaded plug shaft, and a plug gasket, which is disposed circumferentially around the threaded plug shaft between the end plate and the activation plate and has a female tapered inner surface that can slide along a male tapered surface of the end plate and/or the activation plate. Accordingly, in such embodiments, an open end of a pipe bore 32 of a flexible pipe 20 may be plugged at least in part by inserting a mechanical plug into the pipe bore 32 and, subsequently, tightening a nut on the threaded shaft of the mechanical plug to push the activation plate and, thus, the plug gasket of the mechanical plug toward the end plate of the mechanical plug, thereby causing the female tapered inner surface of the plug gasket to slide up the male taper surface of the end plate and/or the activation plate and, thus, the outer surface of the plug gasket to expand radially outward such that it is compressed against the inner surface 30 of the tubing 22 of the flexible pipe 20.

Since the outer surface of a plug gasket in a mechanical plug generally expands radially outward in a uniform manner, a bore plug assembly 96 that includes a mechanical plug may be suitable for plugging on open end of a pipe bore 32 that has a circular shape. However, at least in some instances, at least a portion a flexible pipe 20 may be inadvertently flattened (e.g., deformed), for example, due to gravity pulling down on the flexible pipe 20 and/or the flexible pipe 20 having to be bent such that the outer diameter of each pipe wrap layer 56 is larger than its inner diameter to form the flexible pipe 20 into a pipe coil 46. In other words, in such instances, the pipe bore 32 of a flexible pipe 20 may have an oval shape. To facilitate plugging a pipe bore 32 that may potentially have a non-circular (e.g., oval) shape, in other embodiments, a bore plug assembly 96 in a pipe handling system 62 may include an inflatable (e.g., pneumatic) plug, for example, instead of a mechanical plug.

Figure 6:
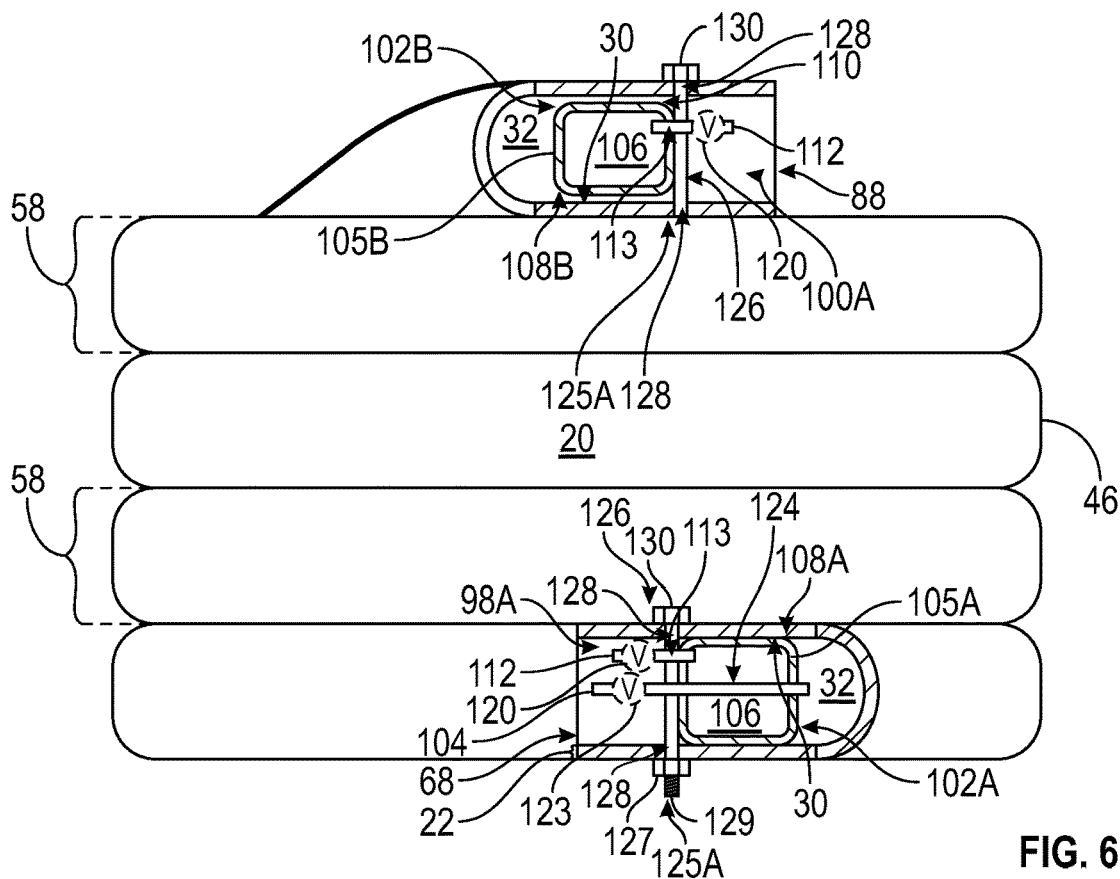
FIG. 6 is a top view of a partial cross-section of a pipe coil and examples of bore plug assemblies that may be included in the pipe handling system of FIG. 5, in accordance with an embodiment of the present disclosure.

To help illustrate, an example of an outboard (e.g., outer and/or first) bore plug assembly 98A and of an inboard (e.g., inner and/or second) bore plug assembly 100A, which may be included in a pipe handling system 62, is shown in FIG. 6. In particular, as in the depicted example, an outboard bore plug assembly 98 in a pipe handling system 62 may generally be disposed within an outboard (e.g., outer, free, and/or first) end 68 of the pipe bore 32 in a flexible pipe 20 that is formed into a pipe coil 46 to facilitate plugging the outboard end 68 of the pipe bore 32 while an inboard bore plug assembly 100 in the pipe handling system 62 may generally be disposed within an inboard (e.g., inner and/or second) end 88 of the pipe bore 32 to facilitate plugging the inboard end 88 of the pipe bore 32. Additionally, as in the depicted example, to facilitate accessing an inboard end 88 of a flexible pipe 20 that is formed into a pipe coil 46 and, thus, plugging the inboard end 88 of its pipe bore 32, in some embodiments, the inboard end 88 of the flexible pipe 20 may be pulled out from the pipe coil 46, for example, via pipe grabbing equipment 90, such as a pipe gripper or pipe grabber, lifting equipment 92, such as a trackhoe, and/or pulling equipment 72, such as a bulldozer.

However, it should be appreciated that the depicted example is merely intended to be illustrative and not limiting. In particular, in other embodiments, an inboard bore plug assembly 100 may be used to plug an inboard end 88 of the pipe bore 32 of a flexible pipe 20 that is formed into a pipe coil 46 without pulling the inboard end 88 of the flexible pipe 20 out from the pipe coil 46, for example, when a pipe drum 66 and pipe handling equipment 64 on which the pipe coil 46 is loaded provide access to the inboard end 88 of the pipe bore 32. Additionally, in other embodiments, a pipe coil 46 may be formed to include more than four (e.g., five, six, or more) pipe wraps 58 or fewer than four (e.g., three, two, or fewer) pipe wraps 58.

In any case, as in the depicted example, to facilitate plugging an (e.g., inboard or outboard) end of the pipe bore 32 of a flexible pipe 20, in some embodiments, a (e.g., inboard or outboard) bore plug assembly 96 may include an inflatable (e.g., pneumatic and/or hydraulic) plug 102, which has an inflatable (e.g., fluid) bladder 105 that defines a fluid cavity 106. Accordingly, in such embodiments, supplying inflation fluid, such as liquid and/or gas, into a fluid cavity 106 in an inflatable plug 102 may transition (e.g., inflate) its inflatable bladder 105 from a less inflated (e.g., uninflated or partially inflated) state to a more (e.g., fully) inflated state such that the outer surface 108 of the inflatable bladder 105 expands radially outward, for example, to enable the outer surface 108 of the inflatable bladder 105 to be circumferentially compressed against and, thus, circumferentially engaged with the inner surface 30 of the tubing 22 of a flexible pipe 20, thereby facilitating plugging of the pipe bore 32 defined by the flexible pipe tubing 22. In particular, in such embodiments, the flexibility (e.g., pliability and/or malleability) of an inflatable bladder in an inflatable plug may enable the outer surface of the inflatable bladder to expand radially outward in a non-uniform manner (e.g., in accordance with the shape of the inner surface of flexible pipe tubing), thereby enabling the inflatable plug to be suitable for plugging a pipe bore that has a non-circular shape.

To help illustrate, FIG. 6 shows the outboard bore plug assembly 98A with its inflatable bladder 105A in a more (e.g., fully) inflated state and the inboard bore plug assembly 100A with its inflatable bladder 105B in a less inflated (e.g., uninflated or partially inflated) state. In particular, as depicted, while in the more inflated state, the outer surface 108A of the inflatable bladder 105A in the outboard bore plug assembly 98A engages the inner surface 30 of the tubing 22 of the flexible pipe 20 and, thus, facilitates plugging the outboard end 68 of the flexible pipe 20. On the other hand, as depicted, while in the less inflated state, open space 110 is present between the outer surface 108B of the inflatable bladder 105B in the inboard bore plug assembly 100A and the inner surface 30 of the tubing 22 of the flexible pipe 20, thereby enabling the inflatable bladder 105B to be relatively freely inserted into and/or withdrawn from the pipe bore 32 of the flexible pipe 20.

Accordingly, a bore plug assembly 96 that includes an inflatable plug 102 may generally be deployed in the pipe bore 32 of a flexible pipe 20 at least in part by inserting the inflatable bladder 105 of the inflatable plug 102 into the pipe bore 32 while the inflatable bladder 105 is in a less inflated state. In particular, as in the depicted example, in some embodiments, an inflatable plug 102 of a bore plug assembly 96 may be completely inserted into the pipe bore 32 of a flexible pipe 20 such that it does not stick out of the pipe bore 32, for example, to facilitate reducing the likelihood of the inflatable plug 102 inadvertently being knocked out of the pipe bore 32 by equipment in a pipe handling system 62 and/or inadvertently interfering with pipe deployment via the pipe handling system 62. In any case, to facilitate plugging the pipe bore 32 of the flexible pipe 20, an inflatable bladder 105 of an inflatable plug 102 in bore plug assembly 96 may then be transitioned from the less inflated state to a more inflated state, which causes the outer surface 108 of the inflatable bladder 105 to be circumferentially compressed against and, thus, circumferentially engaged with the inner surface 30 of the tubing 22 of the flexible pipe 20. Thus, in the depicted example, to facilitate plugging the inboard end 88 of the pipe bore 32 of the flexible pipe 20, the inflatable bladder 105B of the inboard bore plug assembly 100A may be transitioned from its current inflation (e.g., less inflated) state to a more inflated state.

On the other hand, in embodiments of a bore plug assembly 96 that includes an inflatable plug 102, extracting (e.g., releasing) inflation fluid from a fluid cavity 106 in an inflatable plug 102 may transition its inflatable bladder 105 from a more inflated state to a less inflated state such that the outer surface 108 of the inflatable bladder 105 contracts radially inward, for example, to enable the outer surface 108 of the inflatable bladder 105 to disengage from the inner surface 30 of the tubing 22 of a flexible pipe 20, thereby facilitating unplugging of the pipe bore 32 defined by the flexible pipe tubing 22. Thus, in the depicted example, to facilitate unplugging the outboard end 68 of the flexible pipe 20, the inflatable bladder 105A of the outboard bore plug assembly 98A may be transitioned from its current inflation (e.g., more inflated) state to a less inflated state.

To facilitate controlling the fluid pressure within its fluid cavity 106 and, thus, the inflation state of its inflatable bladder 105, as depicted, an inflatable plug 102 in a (e.g., inboard or outboard) bore plug assembly 96 generally include an inflation fluid port 112, which is secured in an inflation port opening 113 formed through the inflatable bladder 105 such that it opens to the fluid cavity 106. Accordingly, an inflatable bladder 105 in an inflatable plug 102 of a bore plug assembly 96 may be transitioned (e.g., inflated) from a less inflated state to a more inflated state at least in part by supplying inflation fluid to an inflation fluid port 112 of the inflatable plug 102. On the other hand, an inflatable bladder 105 in an inflatable plug 102 of a bore plug assembly 96 may be transitioned (e.g., deflated) from a more inflated state to a less inflated state at least in part by extracting (e.g., releasing) inflation fluid from the inflation fluid port 112 of the inflatable plug 102.

Returning to FIG. 5, to facilitate supplying inflation fluid to and/or extracting inflation fluid from and, thus, controlling the inflation state of an inflatable plug 102 of a bore plug assembly 96, a pipe handling system 62 may additionally include an inflation fluid source (e.g., pump) 114, which can be fluidly connected to an inflation fluid port 112 of the inflatable plug 102 via one or more inflation fluid conduits 116, such as a hose. As described above, in some embodiments, a pipe handling system 62 may elevate the fluid pressure within the pipe bore 32 of a flexible pipe 20 to a target fluid pressure. In fact, in some embodiments, the fluid pressure sealed within the pipe bore 32 of a flexible pipe 20 may vary with the fluid pressure within an inflatable bladder 105 of a bore plug assembly 96 that is used to seal an end of the pipe bore 32. Merely as illustrative non-limiting example, plugging a pipe bore 32 using a bore plug assembly 96 that has its inflatable bladder 105 inflated to forty pounds per square inch may enable the pipe bore 32 to be held at a fluid pressure up to forty pounds per square inch, for example, due to inflatable bladder 105 allowing fluid pressure above forty pounds per square inch to escape from the pipe bore 32, thereby self-regulating the fluid pressure within the pipe bore 32.

Accordingly, to facilitate controlling the fluid pressure within the pipe bore 32 of a flexible pipe 20, in some embodiments, a pipe handling system 62 may control the fluid pressure within the inflatable bladders 105 in its bore plug assemblies 96. To facilitate controlling the fluid pressure within an inflatable bladder 105 of a bore plug assembly 96, in some embodiments, a pipe handling system 62 may include one or more inflation fluid pressure sensors 118, which are each fluidly connected to the fluid cavity 106 in the inflatable bladder 105, for example, between an inflation fluid source 114 and an inflation fluid port 112 of the bore plug assembly 96. In fact, since fluid pressure within the pipe bore 32 of a flexible pipe 20 generally varies with the fluid pressure within an inflatable bladder 105 of a bore plug assembly 96 that is used to plug the pipe bore 32, in some embodiments, an inflation fluid pressure sensor 118 that enables a pipe handling system 62 to determine the fluid pressure within the inflatable bladder 105 may obviate a separate bore fluid pressure sensor 107.

In any case, as in the example depicted in FIG. 6, to facilitate further controlling supply of inflation fluid to and/or extraction of inflation fluid from and, thus, the inflation state of an inflatable plug 102 in a bore plug assembly 96, in some embodiments, an inflation fluid port 112 of the inflatable plug 102 may include an inflation fluid valve 120, which may be selectively transitioned between an opened state and a closed state. In particular, in such embodiments, the inflation fluid valve 120 may enable inflation fluid to be supplied to and/or extracted from the fluid cavity 106 of the inflatable plug 102 while in an opened state and block the supply and/or the extraction of inflation fluid from the fluid cavity 106 of the inflation plug 102 while in a closed state.

Additionally, as in the depicted example, to facilitate elevating the fluid pressure within the pipe bore 32 of a flexible pipe 20, in some embodiments, an outboard bore plug assembly 98 may include a bore fluid port 104 that opens through the inflatable bladder 105 of its inflatable plug 102. In particular, in the depicted example, to facilitate extending a bore fluid port 104 therethrough, the inflatable bladder 105A of the inflatable plug 102A in the outboard bore plug assembly 98A is donut shaped to define a bore port opening 124, for example, while the inflatable bladder 105B of the inflatable plug 102B is cylindrically shaped. A bore fluid port 104 may then be secured within the bore port opening 124 such that the bore fluid port 104 extends through the inflatable plug 102 of the outboard bore plug assembly 98 to enable the bore fluid port 104 to be fluidly connected with a pipe bore 32 that is to be plugged by the outboard bore plug assembly 98.

Furthermore, as in the depicted example, to facilitate further controlling supply of bore fluid to and/or extraction of bore fluid from and, thus, the fluid pressure within the pipe bore 32 of a flexible pipe 20, in some embodiments, a bore fluid port 104 may include a bore fluid valve 123, which may be selectively transitioned between an opened state and a closed state. In particular, in such embodiments, the bore fluid valve 123 may enable bore fluid to be supplied to and/or extracted from the pipe bore 32 of a flexible pipe 20 while in an opened state and block the supply and/or the extraction of bore fluid from the pipe bore 32 of the flexible pipe 20 while in a closed state. In fact, in some such embodiments, a bore fluid valve 123 on a bore fluid port 104 may be a relief valve, which maintains a closed state when a fluid pressure differential across the bore fluid valve 123 is less than a threshold fluid pressure differential and automatically transitions to an opened state when the fluid pressure differential across the bore fluid valve 123 is not less than (e.g., greater than or equal to) the threshold fluid pressure differential, for example, to enable the bore fluid valve 123 to facilitate regulating fluid pressure within the pipe bore 32 of a flexible pipe 20.

However, it should again be appreciated that the depicted example is merely intended to be illustrative and not limiting. In particular, in other embodiments, a bore fluid port 104 in an outboard bore plug assembly 98 may not include a bore fluid valve 123, for example, when the bore fluid port 104 remains in a closed state unless a bore fluid conduit 101 is connected thereto. Additionally or alternatively, in other embodiments, an inflation fluid port 112 in a bore plug assembly 98 may not include an inflation fluid valve 120, for example, when its inflation fluid port 112 remains in a closed state unless an inflation fluid conduit 116 is connected thereto.

In any case, as described above, inflating an inflatable bladder 105 in an inflatable plug 102 of a bore plug assembly 98 to a more inflated state may cause the inflatable bladder 105 of the inflatable plug 102 to expand radially outward. In particular, inflating an inflatable bladder 105 in an inflatable plug 102 of a bore plug assembly 98 to a more inflated state may cause the outer surface 108 of the inflatable bladder 105 to be circumferentially compressed against and, thus, circumferentially engaged with the inner surface 30 of the tubing 22 of a flexible pipe 20, thereby facilitating plugging of the pipe bore 32 of the flexible pipe 20. However, at least in some instances, pressurizing the pipe bore 32 of a flexible pipe 20 to an elevated fluid pressure may result in the elevated fluid pressure overpowering the engagement between a (e.g., mechanical or inflatable) plug of a bore plug assembly 96, thereby inadvertently pushing the plug out of the pipe bore 32.

As in the depicted example, to facilitate reducing the likelihood of its (e.g., inflatable) plug being inadvertently pushed out of the pipe bore 32 of a flexible pipe 20, in some embodiments, a bore plug assembly 96 in a pipe handling system 62 may additionally include a plug securement mechanism 125, for example, which includes one or more (e.g., threaded) fasteners 126, such as a bolt, a screw, or a pin, one or more (e.g., threaded) retainers 127, such as a nut or a cotter pin, that may each be secured to an (e.g., threaded) end 129 of a fastener 126, a support plate that may be secured between the plug and a fastener 126, a shackle that may be secured behind the plug via a fastener 126, or any combination thereof. In particular, in the depicted example, the plug securement mechanism 125A in each bore plug assembly 96 includes a threaded fastener 126, such as a bolt or a screw, which is inserted through fastener openings 128 formed (e.g., drilled) through the tubing 22 of the flexible pipe 20 behind an inflatable plug 102 of the bore plug assembly 96 such that a fastener head 130 and a threaded end 129 of the threaded fastener 126 are disposed outside the flexible pipe tubing 22, and a threaded retainer 127, such as a nut, which is secured to the threaded end 129 of the threaded fastener 126 to facilitate securing the threaded fastener 126 to the flexible pipe tubing 22 such that the threaded fastener 126 is disposed within the pipe bore 32 of the flexible pipe 20 behind the inflatable plug 102.

However, it should again be appreciated that the depicted example is merely intended to be illustrative and not limiting. In particular, in other embodiments, a fastener 126 in a plug securement mechanism 125 of a bore plug assembly 96 may be a pin, which does not include threading, and a corresponding retainer 127 in the plug securement mechanism 125 may be a cotter pin that is to be secured to an end 129 of the pin to facilitate securing the pin in a corresponding fastener opening 128 and, thus, not include threading. Furthermore, to facilitate distributing force across the diameter of a (e.g., inflatable) plug in a bore plug assembly 96 more uniformly and, thus, reducing the likelihood of the plug rolling over a (e.g., threaded) fastener 126 such that the inflatable plug 102 inadvertently disengages from the tubing 22 of a flexible pipe 20, in other embodiments, a plug securement mechanism 125 in the bore plug assembly 96 may include multiple fasteners 126, which are each to be secured behind the plug. Additionally or alternatively, to facilitate distributing force across the diameter of a (e.g., inflatable) plug in a bore plug assembly 96 more uniformly and, thus, reducing the likelihood of the plug rolling over a fastener 126 such that the plug inadvertently disengages from the tubing 22 of a flexible pipe 20, in other embodiments, a plug securement mechanism 125 in the bore plug assembly 96 may include a support plate, which is to be secured between the fastener 126 and the plug.

Figure 7:
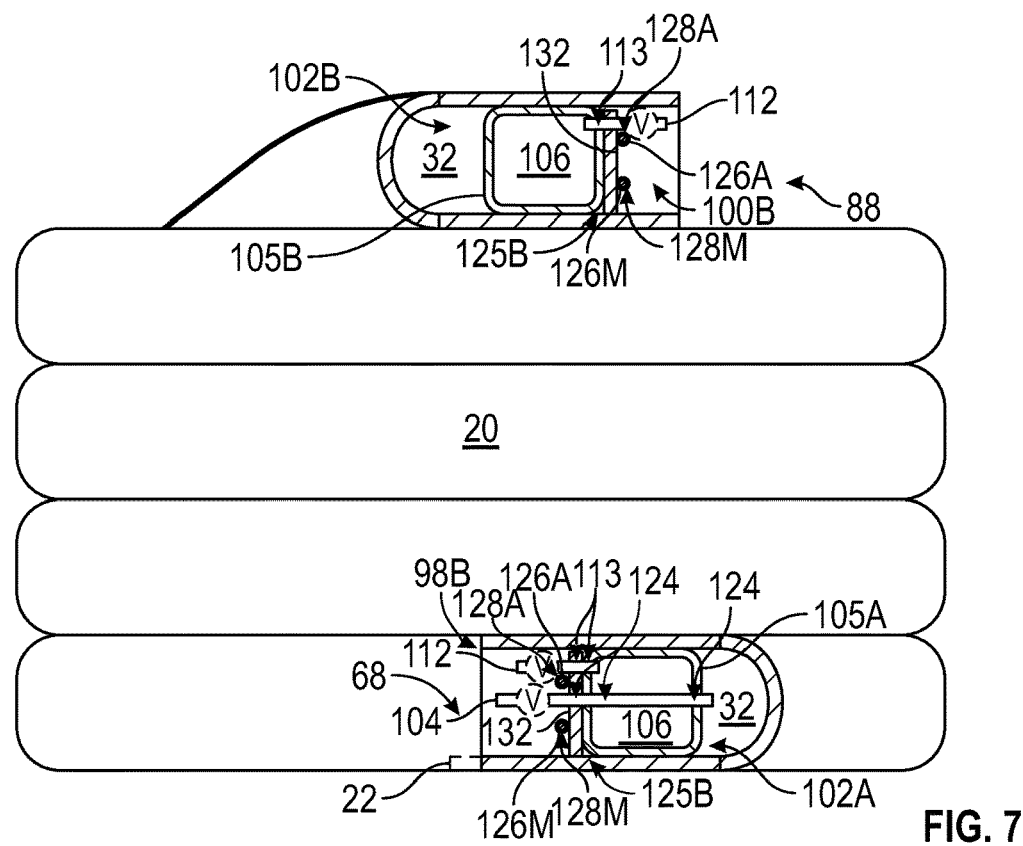
FIG. 7 is a top view of a partial cross-section of a pipe coil and other examples of bore plug assemblies that may be included in the pipe handling system of FIG. 5, in accordance with an embodiment of the present disclosure.

To help illustrate, another example of an outboard (e.g., outer and/or first) bore plug assembly 98B and of an inboard (e.g., inner and/or second) bore plug assembly 100B, which may be included in a pipe handling system 62, is shown in FIG. 7. In particular, similar to the outboard bore plug assembly 98A of FIG. 6, the outboard bore plug assembly 98B of FIG. 7 generally includes an inflatable plug 102A, which has an inflatable bladder 105A that defines a fluid cavity 106, an inflation port opening 113, and a bore port opening 124 as well as an inflation fluid port 112 secured within the inflation port opening 113 such that the inflation fluid port 112 opens to the fluid cavity 106, a bore port 104, which is secured within the bore port opening 124 such that the bore fluid port 104 extends through the inflatable bladder 105 and can open to the pipe bore 32 of a flexible pipe 20, and a plug securement mechanism 125B, which includes a (e.g., first threaded) fastener 126A that is secured in a (e.g., first) fastener opening 128A in the tubing 22 of the flexible pipe 20 such that the fastener 126A extends into the pipe bore 32 of the flexible pipe 20 behind the inflatable plug 102A to facilitate blocking the inflatable plug 102A from inadvertently being pushed out of the outboard end 68 of the pipe bore 32.

Additionally, similar to the inboard bore plug assembly 100A of FIG. 6, the inboard bore plug assembly 100B of FIG. 7 generally includes an inflatable plug 102B, which has an inflatable bladder 105B that defines a fluid cavity 106 and an inflation port opening 113 as well as an inflation fluid port 112 secured within the inflation port opening 113 such that the inflation fluid port 112 opens to the fluid cavity 106, and a plug securement mechanism 125B, which includes a (e.g., first threaded) fastener 126A that is secured in a (e.g., first) fastener opening 128A in the tubing 22 of a flexible pipe 20 such that the fastener 126A extends into the pipe bore 32 of the flexible pipe 20 behind the inflatable plug 102B to facilitate blocking the inflatable plug 102B from inadvertently being pushed out of the inboard end 88 of the pipe bore 32. Furthermore, similar to the inflatable plugs 102 in the bore plug assemblies 96 of FIG. 6, the inflatable plugs 102 in the bore plug assemblies 96 of FIG. 7 are each completely inserted into the pipe bore 32 of the flexible pipe 20 such that it does not stick out of the pipe bore 32, for example, to facilitate reducing the likelihood of the inflatable plug 102 inadvertently being knocked out of the pipe bore 32 by equipment in a pipe handling system 62 and/or inadvertently interfering with pipe deployment via the pipe handling system 62.

However, as depicted in FIG. 7, the plug securement mechanisms 125B in the outboard bore plug assembly 98B and the inboard bore plug assembly 100B each additionally includes another (e.g., second threaded or Mth threaded) fastener 126M, which is secured in another (e.g., second or Mth) fastener opening 128M formed in the tubing 22 of the flexible pipe 20 such that the other fastener 126M extends into the pipe bore 32 of the flexible pipe 20 behind a corresponding inflatable plug 102. In particular, in FIG. 7, the fasteners 126 in each plug securement mechanism 125B are spaced apart along the diameter of a corresponding inflatable plug 102, thereby increasing the surface area of the inflatable plug 102 that is blocked from axial deformation by solid material of the plug securement mechanism 125 and, thus, reducing the likelihood of the inflatable plug 102 rolling over a fastener 126 such that the inflatable plug 102 inadvertently disengages from the tubing 22 of the flexible pipe 20. For example, a fastener 126A of may be secured at one third of the diameter of a corresponding pipe bore 32 and, thus, one third of the diameter of an inflatable bladder 105 in a corresponding inflatable plug 102 while it is in its more inflated state and another fastener 126M may be secured at two thirds of the diameter of the pipe bore 32 and, thus, two thirds of the diameter of the inflatable bladder 105 in the inflatable plug 102 while it is in its more inflated state.

Additionally, as depicted, to facilitate reducing the likelihood of its inflatable plug 102 rolling over a fastener 126 such that the inflatable plug 102 inadvertently disengages from the tubing 22 of the flexible pipe 20, the plug securement mechanisms 125B of the outboard bore plug assembly 98B and the inboard bore plug assembly 100B each additionally includes a support plate 132. In particular, as depicted, the support plate 132 in each plug securement mechanism 125B is disposed between a fastener 126 and a corresponding inflatable plug 102, thereby increasing the surface area of the inflatable plug 102 that is blocked from axial deformation by solid material and, thus, reducing the likelihood of the inflatable plug 102 inadvertently rolling over the fastener 126 such that the inflatable plug 102 inadvertently disengages from the tubing 22 of the flexible pipe 20. Furthermore, as in the depicted example, in some embodiments, a support plate 132 in plug securement mechanism 125 of a bore plug assembly 96 may include an inflation port opening 113, which enables an inflation fluid port 112 of the bore plug assembly 96 to extend therethrough, and/or a bore port opening 124, which enables a bore fluid port 104 of the bore plug assembly 96 to extend therethrough, for example, when the support plate 132 has a circular shape.

However, it should be appreciated that the depicted example is merely intended to be illustrative and not limiting. In particular, in other embodiments, a support plate 132 in a plug securement mechanism 125 of a bore plug assembly 96 may be rectangularly shaped to enable an inflation fluid port 112 of the bore plug assembly 96 to extend past the support plate 132 and, thus, not include an inflation port opening 113. Additionally, in other embodiments, fasteners 126 in a plug securement mechanism 125 of a bore plug assembly 96 may be secured to the tubing 22 of a flexible pipe 20 such that they are oriented in different (e.g., perpendicular and/or orthogonal) directions, for example, instead of being oriented in parallel as shown in FIG. 7. Furthermore, in other embodiments, a plug securement mechanism 125 of a bore plug assembly 96 may include a support plate 132 and a single fastener 126. Alternatively, in other embodiments, a plug securement mechanism 125 of a bore plug assembly 96 may not include a support plate 132, but include multiple fasteners 126, for example, which are to be spaced apart across the diameter of the pipe bore 32 of a corresponding flexible pipe 20, as shown in FIG. 7, or, alternatively, offset along the longitudinal extent 42 of the pipe bore 32 of the flexible pipe 20.

Figure 8:
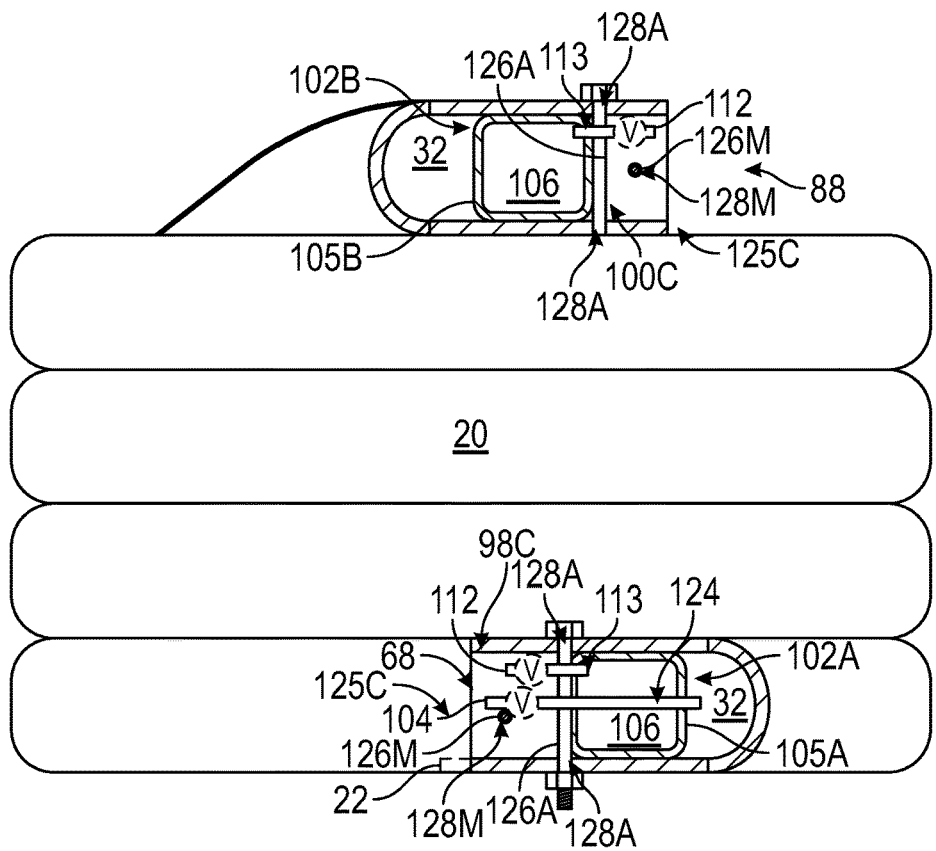
FIG. 8 is a top view of a partial cross-section of a pipe coil and further examples of bore plug assemblies that may be included in the pipe handling system of FIG. 5, in accordance with an embodiment of the present disclosure.

To help illustrate, a further example of an outboard (e.g., outer and/or first) bore plug assembly 98C and of an inboard (e.g., inner and/or second) bore plug assembly 100C, which may be included in a pipe handling system 62, is shown in FIG. 8. In particular, similar to the outboard bore plug assemblies 98 of FIGS. 6 and 7, the outboard bore plug assembly 98C of FIG. 8 generally includes an inflatable plug 102A, which has an inflatable bladder 105A that defines a fluid cavity 106, an inflation port opening 113, and a bore port opening 124 as well as an inflation fluid port 112 secured within the inflation port opening 113 such that the inflation fluid port 112 opens to the fluid cavity 106, a bore fluid port 104, which is secured within the bore port opening 124 such that the bore fluid port 104 extends through the inflatable bladder 105 and can open to the pipe bore 32 of a flexible pipe 20, and a plug securement mechanism 125C, which includes a (e.g., first threaded) fastener 126A that is secured in a (e.g., first) fastener opening 128A in the tubing 22 of the flexible pipe 20 such that the fastener 126A extends into the pipe bore 32 of the flexible pipe 20 behind the inflatable plug 102 to facilitate blocking the inflatable plug 102 from inadvertently being pushed out of the outboard end 68 of the pipe bore 32. Additionally, similar to the inboard bore plug assemblies 100 of FIGS. 6 and 7, the inboard bore plug assembly 100C of FIG. 8 generally includes an inflatable plug 102B, which has an inflatable bladder 105B that defines a fluid cavity 106 and an inflation port opening 113 as well as an inflation fluid port 112 secured within the inflation port opening 113 such that the inflation fluid port 112 opens to the fluid cavity 106, and a plug securement mechanism 125C, which includes a (e.g., first threaded) fastener 126A that is secured in a (e.g., first) fastener opening 128A in the tubing 22 of the flexible pipe 20 such that the fastener 126A extends into the pipe bore 32 of the flexible pipe 20 behind the inflatable plug 102B to facilitate blocking the inflatable plug 102B from inadvertently being pushed out of the inboard end 88 of the pipe bore 32.

Furthermore, similar to the inflatable plugs 102 in the bore plug assemblies 96 of FIGS. 6 and 7, the inflatable plugs 102 in the bore plug assemblies 96 of FIG. 8 are each completely inserted into the pipe bore 32 of the flexible pipe 20 such that it does not stick out of the pipe bore 32, for example, to facilitate reducing the likelihood of the inflatable plug 102 inadvertently being knocked out of the pipe bore 32 by equipment in a pipe handling system 62 and/or inadvertently interfering with pipe deployment via the pipe handling system 62. Moreover, similar to the plug securement mechanisms 125B in the bore plug assemblies 96 of FIG. 7, the plug securement mechanisms 125C in the bore plug assemblies 96 of FIG. 8 each additionally includes another (e.g., second threaded or Mth threaded) fastener 126M, which is secured in another (e.g., second or Mth) fastener opening 128M in the tubing 22 of the flexible pipe 20 such that the other fastener 126M extends into the pipe bore 32 of the flexible pipe 20 behind a corresponding inflatable plug 102.

However, as depicted in FIG. 8, the other fastener 126M in each plug securement mechanism 125C is secured to the tubing 22 of the flexible pipe 20 such that it extends into the pipe bore 32 of the flexible pipe 20 behind the fastener 126A in the plug securement mechanism 125C, which, at least in some instances, may facilitate further reducing the likelihood of a corresponding inflatable plug 102 being inadvertently pushed out of the pipe bore 32 of the flexible pipe 20, for example, due to the other fastener 126M acting as a backup to the fastener 126A. In fact, as in the depicted example, to facilitate reducing the likelihood of an inflatable plug 102 of a bore plug assembly 96 rolling over a fastener 126A such that the inflatable plug 102 inadvertently disengages from the tubing 22 of a flexible pipe 20, in some embodiments, another fastener 126M of a plug securement mechanism 125 in the bore plug assembly 96 may be secured behind the fastener 126A such that the fastener 126A and the other fastener 126M are oriented in different (e.g., perpendicular and/or orthogonal) directions, thereby enabling the other fastener 126M to facilitate limiting the amount the inflatable plug 102 is able to axially roll over the fastener 126A.

Nevertheless, it should be appreciated that the depicted example is merely intended to be illustrative and not limiting. In particular, in other embodiments, a plug securement mechanism 125 in a bore plug assembly 96 may include a (e.g., threaded) fastener 126A and another (e.g., threaded) fastener 126M, which is to be secured behind the fastener 126A, as well as a support plate 132, which is to be secured directly between the fastener 126A and an inflatable plug 102 of the bore plug assembly 96. Additionally, in other embodiments, a plug securement mechanism 125 in a bore plug assembly 96 may include more than two fasteners 126. Merely as an illustrative non-limiting example, in some such embodiments, a plug securement mechanism 125 in a bore plug assembly 96 may include four threaded fasteners 126, which are secured in corresponding fastener openings 128 in the tubing 22 of a flexible pipe 20 via corresponding threaded retainers 127 such that their threaded ends 129 extend into the pipe bore 32 of the flexible pipe 20 behind a plug of the bore plug assembly 96, for example, such that a support plate 132 is disposed between the threaded retainers 127 and the plug and/or such that the threaded retainers 126 extend orthogonal (e.g., perpendicular) relative to one another. Moreover, to facilitate blocking an inflatable plug 102 of a bore plug assembly 96 from inadvertently being pushed out of the pipe bore 32 of a flexible pipe 20, in other embodiments, a plug securement mechanism 125 in the bore plug assembly 96 may additionally include a shackle, which is to be secured to the tubing 22 of the flexible pipe 20 such that the shackle partially extends into the pipe bore 32 of the flexible pipe 20 behind the inflatable plug 102.

Figure 9:
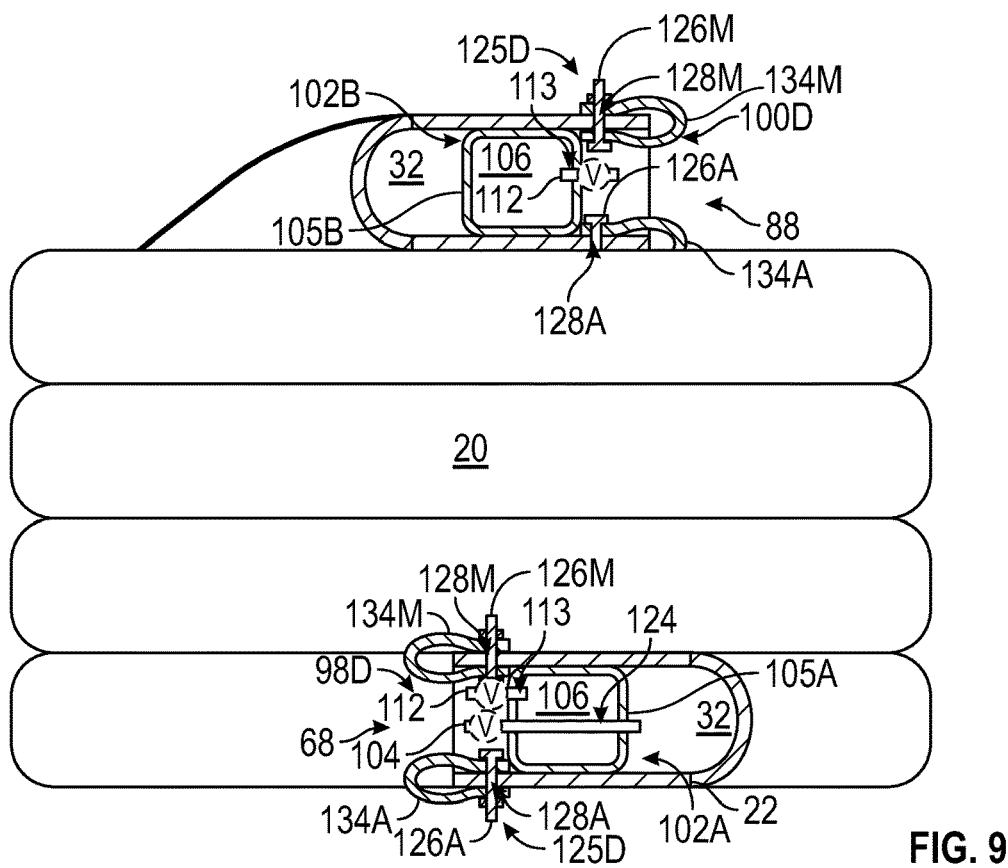
FIG. 9 is a top view of a partial cross-section of a pipe coil and other examples of bore plug assemblies that may be included in the pipe handling system of FIG. 5, in accordance with an embodiment of the present disclosure.

To help illustrate, another example of an outboard (e.g., outer and/or first) bore plug assembly 98D and of an inboard (e.g., inner and/or second) bore plug assembly 100D, which may be included in a pipe handling system 62, is shown in FIG. 9. In particular, similar to the outboard bore plug assemblies 98 of FIGS. 6-8, the outboard bore plug assembly 98D of FIG. 9 generally includes an inflatable plug 102A, which has an inflatable bladder 105A that defines a fluid cavity 106, an inflation port opening 113, and a bore port opening 124 as well as an inflation fluid port 112 secured within the inflation port opening 113 such that the inflation fluid port 112 opens to the fluid cavity 106, a bore fluid port 104, which is secured within the bore port opening 124 such that the bore fluid port 104 extends through the inflatable bladder 105 and can open to the pipe bore 32 of a flexible pipe 20, and a plug securement mechanism 125D, which includes a (e.g., first threaded) fastener 126A that is secured in a (e.g., first) fastener opening 128A in the tubing 22 of the flexible pipe 20 such that the fastener 126A extends into the pipe bore 32 of the flexible pipe 20 behind the inflatable plug 102A to facilitate blocking the inflatable plug 102A from inadvertently being pushed out of the outboard end 68 of the pipe bore 32. Additionally, similar to the inboard bore plug assemblies 100 of FIGS. 6-8, the inboard bore plug assembly 100D of FIG. 9 generally includes an inflatable plug 102B, which has an inflatable bladder 105B that defines a fluid cavity 106 and an inflation port opening 113 as well as an inflation fluid port 112 secured within the inflation port opening 113 such that the inflation fluid port 112 opens to the fluid cavity 106, and a plug securement mechanism 125D, which includes a (e.g., first threaded) fastener 126A that is secured in a (e.g., first) fastener opening 128A in the tubing 22 of a flexible pipe 20 such that the fastener 126A extends into the pipe bore 32 of the flexible pipe 20 behind the inflatable plug 102B to facilitate blocking the inflatable plug 102B from inadvertently being pushed out of the inboard end 88 of the pipe bore 32.

Furthermore, similar to the inflatable plugs 102 in the bore plug assemblies 96 of FIGS. 6-8, the inflatable plugs 102 in the bore plug assemblies 96 of FIG. 9 are each completely inserted into the pipe bore 32 of the flexible pipe 20 such that it does not stick out of the pipe bore 32, for example, to facilitate reducing the likelihood of the inflatable plug 102 inadvertently being knocked out of the pipe bore 32 by equipment in a pipe handling system 62 and/or inadvertently interfering with pipe deployment via the pipe handling system 62. Moreover, similar to plug securement mechanisms 125 in the bore plug assemblies 96 of FIGS. 7 and 8, the plug securement mechanisms 125D in the bore plug assembly 96 of FIG. 9 each additionally includes another (e.g., second threaded or Mth threaded) fastener 126M, which is secured in another (e.g., second or Mth) fastener opening 128M such that the other fastener 126M extends into the pipe bore 32 of the flexible pipe 20 behind a corresponding inflatable plug 102.

However, to facilitate blocking an inflatable plug 102 of a bore plug assembly 96 from inadvertently being pushed out of the pipe bore 32 of a flexible pipe 20, as depicted in FIG. 9, the plug securement mechanisms 125D of the outboard bore plug assembly 98D and the inboard bore plug assembly 100D each additionally includes a (e.g., first) shackle 134A, which is secured to the tubing 22 of the flexible pipe 20 behind a corresponding inflatable plug 102 via a fastener 126A. As in the depicted example, to facilitate further reducing the likelihood of an inflatable plug 102 a bore plug assembly 96 being inadvertently pushed out of the pipe bore 32 of a flexible pipe 20 and/or the likelihood of the inflatable plug 102 deforming (e.g., rolling over) such that it inadvertently disengages from the tubing 22 of the flexible pipe 20, in some embodiments, a plug securement mechanism 125 of the bore plug assembly may additionally include another (e.g., second or Mth) shackle 134M, which is secured to the tubing 22 of a flexible pipe 20 behind the inflatable plug 102 via another fastener 126M.

Nevertheless, it should be appreciated that the depicted example is merely intended to be illustrative and not limiting. In particular, in other embodiments, a plug securement mechanism 125 in a bore plug assembly 96 may include more than two (e.g., three, four, or more) shackles 134 and, thus, more than two fasteners 126. Alternatively, in other embodiments, a plug securement mechanism 125 in a bore plug assembly 96 may include a single shackle 134. Moreover, in other embodiments, a plug securement mechanism 125 in a bore plug assembly 96 may include a shackle 134 as well as a support plate 132, which is to be secured between the shackle 134 and an inflatable plug 102 of the bore plug assembly 96. In any case, in this manner, a bore plug assembly 96 in a pipe handling system 62 may be implemented to enable the pipe handling system 62 to plug the pipe bore 32 of a flexible pipe 20 and, thus, elevate the fluid pressure within the pipe bore 32 of the flexible pipe 20, which, at least in some instances, may facilitate improving operational efficiency and/or operational reliability of a pipeline system 10, for example, by reducing the likelihood of flexible pipe 20 deployed in the pipeline system 10 having inadvertent deformation (e.g., kinking and/or flattening).

Figure 10:
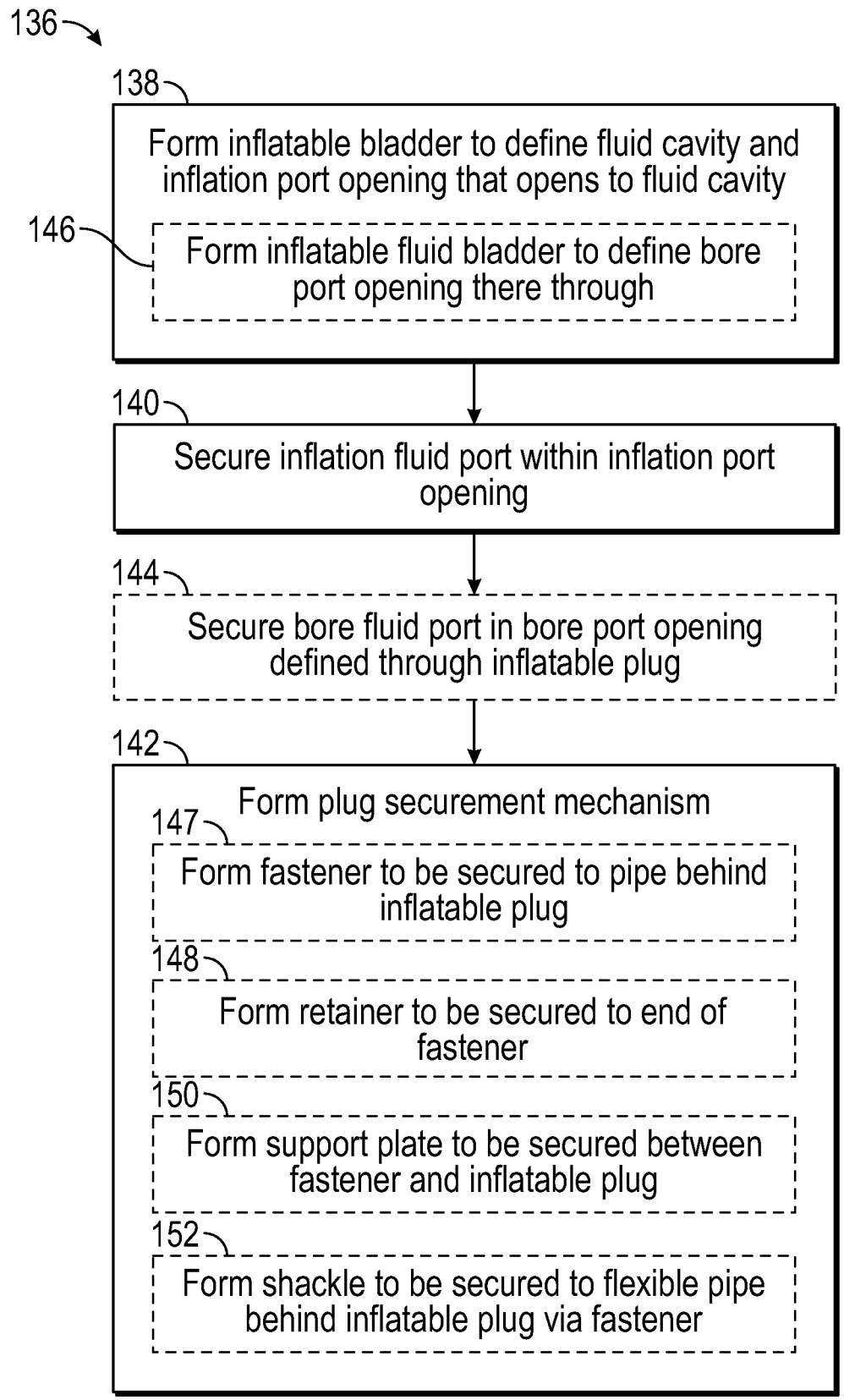
FIG. 10 is a flow diagram of an example of a process for implementing (e.g., manufacturing) a bore plug assembly, in accordance with an embodiment of the present disclosure.

To help illustrate, an example of a process 136 for implementing (e.g., manufacturing) a bore plug assembly 96 (e.g., outboard bore plug assembly 98 and/or inboard bore plug assembly 100) in a pipe handling system 62 is described in FIG. 10. Generally, the process 136 includes forming an inflatable bladder to define a fluid cavity and an inflation port opening that opens to the fluid cavity (process block 138). Additionally, the process 136 generally includes securing an inflation fluid port within the inflation port opening (process block 140) and forming a plug securement mechanism (process block 142).

Although specific process blocks are described in a specific order, which corresponds with an embodiment of the present disclosure, it should be appreciated that the example process 136 is merely intended to be illustrative and not limiting. In particular, in other embodiments, a process 136 for implementing a bore plug assembly 96 may omit one or more of the depicted process blocks and/or include one or more additional process blocks. For example, some embodiments of the process 136 may additionally include securing a bore fluid port in a bore port opening defined by the inflatable bladder (process block 144) while other embodiments of the process 136 do not. Moreover, in other embodiments, one or more of the depicted process blocks may be performed in a different order, for example, such that the plug securement mechanism is formed before the inflatable bladder.

In any case, as described above, to facilitate plugging an open end of a pipe bore 32, in some embodiments, a (e.g., outboard or inboard) bore plug assembly 96 in a pipe handling system 62 may include an inflatable (e.g., pneumatic) plug 102. In particular, as described above, in such embodiments, an inflatable plug 102 in a bore plug assembly 96 may include an inflatable bladder 105, which defines a fluid cavity 106. In such embodiments, an inflatable bladder 105 of an inflatable plug 102 may generally expand radially outward when inflation fluid, such as liquid and/or gas, is supplied to its fluid cavity 106 to transition the inflatable bladder 105 from a less inflated (e.g., deflated) state toward a more (e.g., fully) inflated state. On the other hand, in such embodiments, an inflatable bladder 105 in an inflatable plug 102 may generally contract radially inward when inflation fluid is extracted (e.g., released) from its fluid cavity 106 to transition the inflatable bladder 105 from a more inflated state toward a less inflated state.

To facilitate controlling supply of inflation fluid to and/or extraction of inflation fluid and, thus, its inflation state, as described above, an inflatable plug 102 in a bore plug assembly 96 may additionally include an inflation fluid port 112, which is fluidly connected to the fluid cavity 106 defined by its inflatable bladder 105, for example, in addition to an inflation fluid source 114 via one or more inflation fluid conduits 116. In particular, as described above, to facilitate fluidly connecting an inflation fluid port 112 to a fluid cavity 106 defined by an inflatable bladder 105, the inflation fluid port 112 may be secured within an inflation port opening 113 formed (e.g., implemented and/or molded) through the inflatable bladder 105 such that it opens to the fluid cavity 106.

Accordingly, implementing an inflatable plug 102 of a bore plug assembly 96 may generally include forming (e.g., implementing and/or molding) an inflatable bladder 105 to define a fluid cavity 106 and an inflation port opening 113 that opens to the fluid cavity 106 (process block 138) and securing an inflation fluid port 112 within the inflation port opening 113 defined by the inflatable bladder 105 (process block 140). In particular, to facilitate selective expansion and/or contraction, in some embodiments, the inflatable bladder 105 of an inflatable plug 102 in a bore plug assembly 96 may be formed at least in part using elastic material, such as rubber. Additionally, in some embodiments, an inflation fluid port 112 of a bore plug assembly 96 may be secured in an inflation port opening 113 of an inflatable bladder 105 in the bore plug assembly 96 using an adhesive, threads, and/or friction between the inflation fluid port 112 and the inflatable bladder 105.

In any case, as described above, bore plug assemblies 96 may be used to facilitate elevating the fluid pressure within the pipe bore 32 of a flexible pipe 20 and, thus, reducing the likelihood of inadvertently deformed (e.g., kinked and/or flattened) flexible pipe 20 being deployed in a pipeline system 10. In particular, as described above, to facilitate elevating the fluid pressure within the pipe bore 32 of a flexible pipe 20, in some embodiments, an outboard bore plug assembly 98 may include a bore fluid port 104, which can be fluidly connected to the pipe bore 32 of the flexible pipe 20, for example, in addition to a bore pressurization fluid source 103 via one or more bore fluid conduits 101. More specifically, as described above, to facilitate fluidly connecting a bore fluid port 104 to a pipe bore 32 that is plugged by an inflatable plug 102, in such embodiments, the bore fluid port 104 may be secured within a bore port opening 124 formed (e.g., implemented and/or molded) through an inflatable bladder 105 of the inflatable plug 102 such that it opens to the fluid cavity 106 defined by the inflatable bladder 105.

Accordingly, in such embodiments, forming an inflatable bladder 105 of an outboard bore plug assembly 98 in a pipe handling system 62 may include forming (e.g., implementing and/or molding) the inflatable bladder 105 to define a bore port opening 124 that opens therethrough to a fluid cavity 106 (process block 146). Additionally, in such embodiments, forming a (e.g., outboard) bore plug assembly 96 may include securing a bore fluid port 104 within a bore port opening 124 defined through an inflatable bladder 105 of the bore plug assembly 96 (process block 144). In particular, in some such embodiments, a bore fluid port 104 of a bore plug assembly 96 may be secured in a bore port opening 124 of an inflatable bladder 105 in the bore plug assembly 96 using an adhesive, threads, and/or friction between the bore fluid port 104 and the inflatable bladder 105.

In any case, as described above, to facilitate reducing the likelihood of its (e.g., inflatable) plug being pushed out of the pipe bore 32 of a flexible pipe 20, a bore plug assembly 98 in a pipe handling system 62 may additionally include a plug securement mechanism 125, which is to be secured to the tubing 22 of the flexible pipe 20 such that the plug securement mechanism 125 at least partially extends into the pipe bore 32 of the flexible pipe 20 behind the plug. In particular, as described above, in some embodiments, a plug securement mechanism 125 in a bore plug assembly 96 may include a (e.g., threaded) fastener 126, such as a bolt, a screw, or a pin, that is formed (e.g., implemented, molded, cast, milled, and/or forged) to be secured to the tubing 22 of a flexible pipe 20 such that the fastener 126 extends into the pipe bore 32 of the flexible pipe 20 behind a plug of the bore plug assembly 96. Accordingly, in such embodiments, forming a plug securement mechanism 125 of a bore plug assembly 96 may include forming (e.g., implementing, molding, milling, casting, and/or forging) a (e.g., threaded) fastener 126 that is to be secured to the tubing 22 of a flexible pipe 20 such that the fastener 126 is disposed within the pipe bore 32 of the flexible pipe 20 behind a (e.g., inflatable) plug of the bore plug assembly 96 and, thus, facilitates blocking the inflatable bladder 105 from inadvertently being pushed out of the pipe bore 32 (process block 147).

Additionally, as described above, to facilitate securing a fastener 126 of a bore plug assembly 98 to the tubing 22 of a flexible pipe 20, in some embodiments, a plug securement mechanism 125 in the bore plug assembly 98 may include a (e.g., threaded) retainer 127, such as a nut or a cotter pin, which is formed (e.g., implemented, molded, milled, forged, and/or cast) to be secured (e.g., tightened) to an (e.g., threaded) end 129 of the fastener 126 after the end 129 is inserted through a fastener opening 128 in the flexible pipe tubing 22. Accordingly, in such embodiments, forming a plug securement mechanism 125 of a bore plug assembly 98 may include forming (e.g., implementing, molding, milling, forging, and/or casting) a (e.g., threaded) retainer 127, such as a nut or a cotter pin, that is to be secured to an end 129 of a fastener 126 in the plug securement mechanism 125 (process block 148).

Furthermore, as described above, to facilitate distributing force more evenly across the diameter of a (e.g., inflatable) plug in a bore plug assembly 96 and, thus, reducing the likelihood of the plug rolling over a fastener 126 such that the plug inadvertently disengages from the tubing 22 of a flexible pipe 20, in some embodiments, a plug securement mechanism 125 in the bore plug assembly 96 may include a support plate 132. In particular, in such embodiments, a support plate 132 in a plug securement mechanism 125 of a bore plug assembly 96 may be formed (e.g., implemented, milled, cast, forged, and/or molded) to be secured between a plug in the bore plug assembly 96 and one or more fasteners 126 in the plug securement mechanism 125. Accordingly, in such embodiments, forming a plug securement mechanism 125 of a bore plug assembly 96 may include forming (e.g., implementing, molding, milling, forging, and/or casting) a support plate 132 that is to be secured between a (e.g., inflatable) plug of the bore plug assembly 96 and one or more fasteners 126 of the plug securement mechanism 125 (process block 150).

In particular, as described above, in some such embodiments, a support plate 132 in a plug securement mechanism 125 of a bore plug assembly 96 may be formed to include an inflation port opening 113, which enables an inflation fluid port 112 of the bore plug assembly 96 to extend therethrough, for example, when the support plate 132 has a circular shape. However, in other such embodiments, a support plate 132 in a plug securement mechanism 125 of a bore plug assembly 96 may be formed with a rectangular shape to enable an inflation fluid port 112 of the bore plug assembly 96 to extend past the support plate 132, for example, without inclusion of an inflation port opening 113.

Moreover, as described above, to facilitate blocking a (e.g., inflatable) plug of a bore plug assembly 96 from inadvertently being pushed out of the pipe bore 32 of a flexible pipe 20, in some embodiments, a plug securement mechanism 125 of the bore plug assembly 96 may include a shackle 134, which is formed (e.g., implemented, milled, molded, cast, and/or forged) to be secured to the tubing 22 of the flexible pipe 20 via a (e.g., threaded) fastener 126 such that the shackle is partially secured within the pipe bore 32 of the flexible pipe 20 behind the plug. Accordingly, in such embodiments, forming a plug securement mechanism 125 of a bore plug assembly 59 may include forming (e.g., implementing, milling, molding, casting, and/or forging) a shackle 134, which is to be secured to the tubing 22 of a flexible pipe 20 such that the shackle 134 partially extends into the pipe bore 32 of the flexible pipe 20 behind a (e.g., inflatable) plug of the bore plug assembly 96 (process block 152). In any case, in this manner, a bore plug assembly 96 in a pipe handling system 62 may be implemented to enable the pipe handling system 62 to elevate the fluid pressure within the pipe bore 32 of a flexible pipe 20, which, at least in some instances, may facilitate improving operational efficiency and/or operational reliability of a pipeline system 10, for example, by reducing the likelihood of flexible pipe 20 deployed from a pipe coil 46 into the pipeline system 10 having inadvertent deformation (e.g., kinking and/or flattening).

Figure 11:
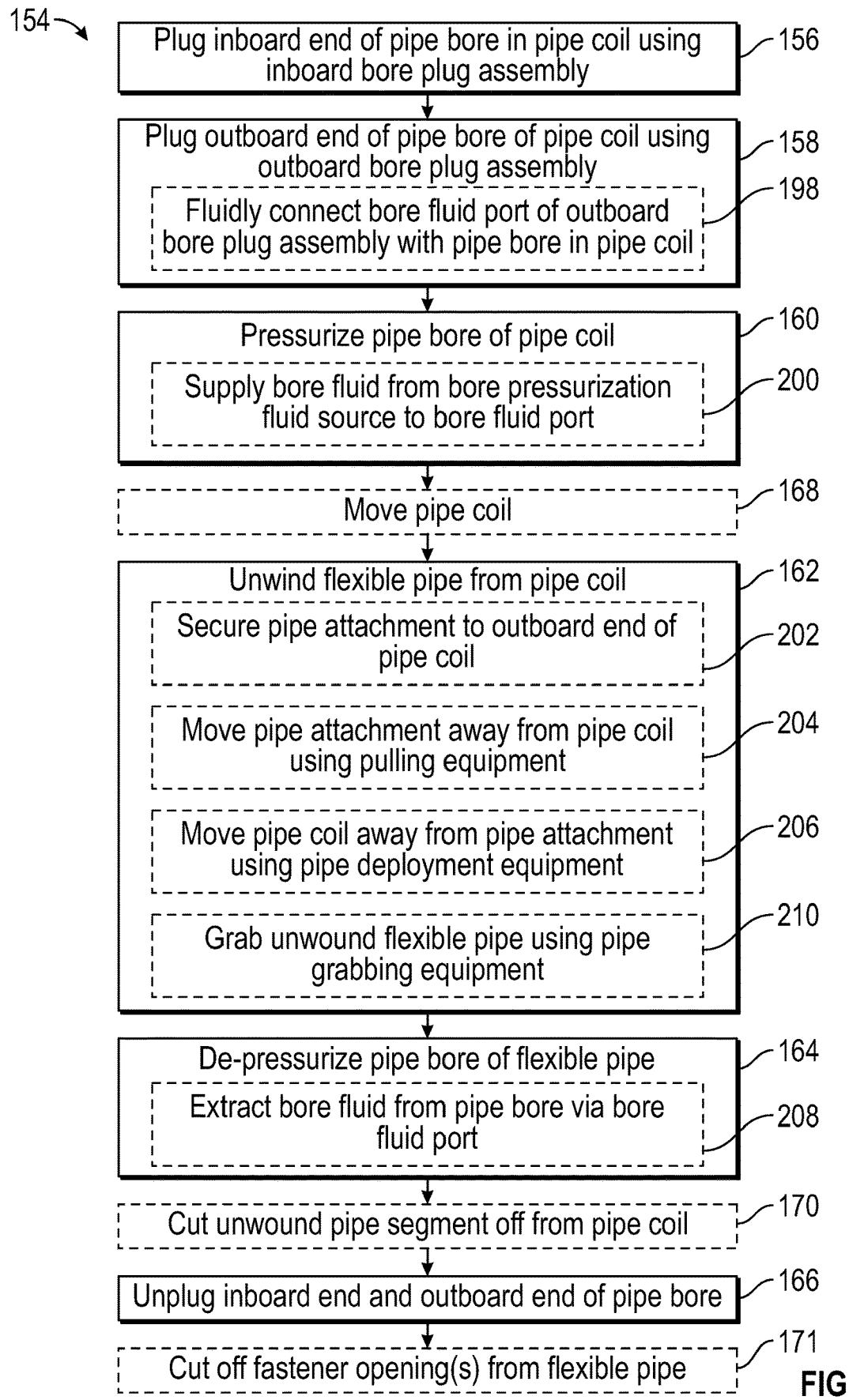
FIG. 11 is a flow diagram of an example of a process for operating a pipe handling system, in accordance with an embodiment of the present disclosure.

To help further illustrate, an example of a process 154 for operating a pipe handling (e.g., deployment and/or transport) system 62 that includes bore plug assemblies 96 is described in FIG. 11. Generally, the process 154 includes plugging an inboard end of a pipe bore in a pipe coil using an inboard bore plug assembly (process block 156), plugging an outboard end of the pipe bore in the pipe coil using an outboard bore plug assembly (process block 158), and pressurizing the pipe bore in the pipe coil (process block 160). Additionally, the process 154 generally includes unwinding flexible pipe from the pipe coil (process block 162), depressurizing the pipe bore of the flexible pipe (process block 164), and unplugging the inboard end and the outboard end of the pipe bore (process block 166).

Although specific process blocks are described in a specific order, which corresponds with an embodiment of the present disclosure, it should be appreciated that the example process 154 is merely intended to be illustrative and not limiting. In particular, in other embodiments, a process 154 for operating a pipe handling system 62 may omit one or more of the depicted process blocks and/or include one or more additional process blocks. For example, some embodiments of the process 154 may additionally include moving the pipe coil (process block 168) while other embodiments of the process 154 do not. As another example, some embodiments of the process 154 may additionally include cutting an unwound pipe segment off from the pipe coil (process block 170) while other embodiments of the process 154 do not. As a further example, some embodiment of the process 154 may additionally include cutting off one or more fastener openings from the flexible pipe (process block 171) while other embodiments of the process 154 do not. Moreover, in other embodiments, one or more of the depicted process blocks may be performed in a different order, for example, such that the outboard end of the pipe bore is plugged before the inboard end of the pipe bore.

In any case, as described above, to facilitate reducing the likelihood of inadvertently deformed (e.g., kinked and/or flattened) flexible pipe 20 being deployed from a pipe coil 46 into a pipeline system 10, a pipe handling system 62 may include an outboard (e.g., first and/or outer) bore plug assembly 98, which is to be used to plug an outboard (e.g., first, outer, and/or free) end 68 of a pipe bore 32 in the pipe coil 46, and an inboard (e.g., second and/or inner) bore plug assembly 100, which is to be used to plug an inboard (e.g., second and/or inner) end 88 of the pipe bore 32 in the pipe coil 46. Accordingly, operating a pipe handling system 62 may generally include plugging an inboard end 88 of a pipe bore 32 in a pipe coil 46 using an inboard bore plug assembly 100 (process block 156) and plugging an outboard end 68 of the pipe bore 32 in the pipe coil 46 using an outboard bore plug assembly 98 (process block 158). In particular, as described above, to facilitate plugging an end of a pipe bore 32, in some embodiments, a bore plug assembly 100 in a pipe handling system 62 may include an inflatable plug 102, which has an inflatable bladder 105 that defines a fluid cavity 106. Accordingly, in such embodiments, a bore plug assembly 100 may plug an end of the pipe bore 32 in a flexible pipe 20 at least in part by expanding (e.g., inflating) the inflatable bladder 105 of its inflatable plug 102 radially outward such that the outer surface 108 of the inflatable bladder 105 is compressed circumferentially against and, thus, circumferentially engaged with the inner surface 30 of the tubing 22 of the flexible pipe 20.

Figure 12:
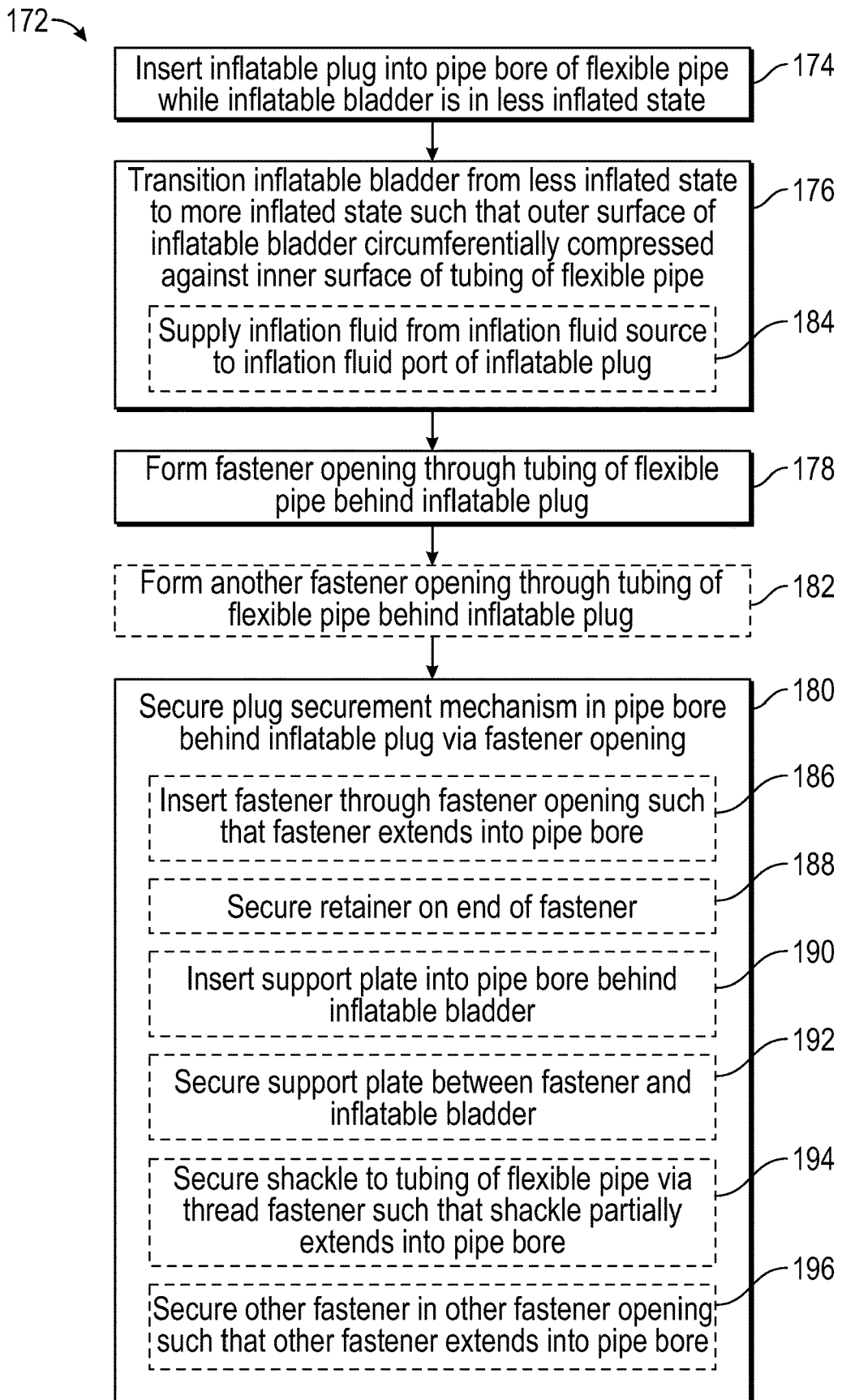
FIG. 12 is a flow diagram of an example of a process for operating a bore plug assembly to plug an open end of a pipe bore, in accordance with an embodiment of the present disclosure.

To help further illustrate, an example of a process 172 for operating a (e.g., inboard or outboard) bore plug assembly 96 in a pipe handling system 62 to facilitate plugging an end of a pipe bore 32 is described in FIG. 12. Generally, the process 172 includes inserting an inflatable plug into a pipe bore of a flexible pipe while its inflatable bladder is in a less inflated state (process block 174) and transitioning the inflatable bladder from the less inflated state to a more inflated state such that an outer surface of the inflatable bladder is circumferentially compressed against an inner surface of tubing of the flexible pipe (process block 176). Additionally, the process 172 generally includes forming a fastener opening through the tubing of the flexible pipe (process block 178) and securing a plug securement mechanism in the pipe bore behind the inflatable plug via the fastener opening (process block 180).

Although specific process blocks are described in a specific order, which corresponds with an embodiment of the present disclosure, it should be appreciated that the example process 172 is merely intended to be illustrative and not limiting. In particular, in other embodiments, a process 172 for operating a bore plug assembly 96 to facilitate plugging an end of a pipe bore 32 may omit one or more of the depicted process blocks and/or include one or more additional process blocks. For example, some embodiments of the process 172 may additionally include forming another fastener opening through the tubing of the flexible pipe behind the inflatable plug (process block 182) while other embodiments of the process 172 do not. Moreover, in other embodiments, one or more of the depicted process blocks may be performed in a different order, for example, such that the plug securement mechanism is secured in the pipe bore behind the inflatable plug before the inflatable bladder of the inflatable plug is transitioned from the less inflated state to the more inflated state.

In any case, as described above, to facilitate plugging an end of a pipe bore 32 in a flexible pipe 20, in some embodiments, a bore plug assembly 96 in a pipe handling system 62 may include an inflatable plug 102, which has an inflatable bladder 105 that defines a fluid cavity 106. In particular, in such embodiments, an inflatable bladder 105 of an inflatable plug 102 may generally expand radially outward when inflated from a less inflated (e.g., deflated) state to a more (e.g., fully) inflated state and contract radially inward when deflated from the more inflated state to the less inflated state. Accordingly, operating a bore plug assembly 96, which includes an inflatable plug 102, to plug an end of a pipe bore 32 may generally include inserting the inflatable plug 102 into the pipe bore 32 while an inflatable bladder 105 of the inflatable plug 102 is in a less inflated state (process block 174). In particular, as described above, in some embodiments, an inflatable plug of a bore plug assembly may be completely inserted into the pipe bore 32 of a flexible pipe 20 such that it does not stick out of the pipe bore 32, for example, to facilitate reducing the likelihood of the inflatable plug 102 inadvertently being knocked out of the pipe bore 32 by equipment in a pipe handling system 62 and/or inadvertently interfering with pipe deployment via the pipe handling system 62.

After an inflatable plug 102 of a bore plug assembly is inserted into the pipe bore 32 of a flexible pipe 20, as described above, to facilitate plugging the pipe bore 32, an inflatable bladder 105 of the inflatable plug 102 may be transitioned (e.g., inflated) from a less inflated state to a more inflated state such that the outer surface 108 of the inflatable bladder 105 is be compressed circumferentially against and, thus, circumferentially engaged with the inner surface 30 of the tubing 22 of the flexible pipe 20. Accordingly, operating a bore plug assembly 96, which includes an inflatable plug 102, to plug an end of a pipe bore 32 in a flexible pipe 20 may generally include transitioning (e.g., inflating) an inflatable bladder 105 of the inflatable plug 102 from a less inflated state to a more inflated state such that the outer surface 108 of the inflatable bladder 105 is compressed circumferentially against and, thus, circumferentially engaged with the inner surface 30 of the tubing 22 of the flexible pipe 20 (process block 176). In particular, as described above, to facilitate supplying inflation fluid to and/or extracting inflation fluid from its fluid cavity 106 and, thus, controlling the inflation state of its inflatable bladder 105, in some embodiments, an inflatable plug 102 in a bore plug assembly 96 may include an inflation fluid port 112, which opens through its inflatable bladder 105 to its fluid cavity 106 and can be fluidly connected to an inflation fluid source (e.g., pump) 114 via one or more inflation fluid conduits 116. Accordingly, in such embodiments, transitioning an inflatable bladder 105 of an inflatable plug 102 from a less inflated state to a more inflated state may include supplying inflation fluid from an inflation fluid source 114 to a corresponding inflation fluid port 112 of the inflatable plug 102 via one or more inflation fluid conduits 116 (process block 184).

As described above, to facilitate blocking its (e.g., inflatable) plug from inadvertently being pushed out of the pipe bore 32 of a flexible pipe 20, in some embodiments, a bore plug assembly 96 in a pipe handling system 62 may additionally include a plug securement mechanism 125, which is to be secured to the tubing 22 of the flexible pipe 20 such that the plug securement mechanism 125 at least partially extends into the pipe bore 32 behind the plug. In particular, as described above, a plug securement mechanism 125 in a bore plug assembly 96 may be secured to the tubing 22 of a flexible pipe 20 via a fastener opening 128 formed through the flexible pipe tubing 22. Accordingly, plugging an end of a pipe bore 32 in a flexible pipe 20 using a bore plug assembly 96 may generally include forming (e.g., implementing and/or drilling) a fastener opening 128 through the tubing 22 of the flexible pipe 20 behind a (e.g., inflatable) plug of the bore plug assembly 96 (process block 178) and securing a plug securement mechanism 125 of the bore plug assembly 96 in the pipe bore 32 behind the plug via the fastener opening 128 (process block 180).

In particular, as described above, a plug securement mechanism 125 in a bore plug assembly 96 may include a (e.g., threaded) fastener 126, such as a bolt, a screw, or a pin, which is to be secured through a fastener opening 128 in the tubing 22 of a flexible pipe 20 such that the fastener 126 at least partially extends into the pipe bore 32 of the flexible pipe 20 behind a plug of the bore plug assembly 96. Accordingly, securing a plug securement mechanism 125 of a bore plug assembly 96 behind a (e.g., inflatable) plug of the bore plug assembly 96 may generally include inserting a (e.g., threaded) fastener 126 through a fastener opening 128 in the tubing 22 of a flexible pipe 20 such that the fastener 126 extends into the pipe bore 32 of the flexible pipe 20 (process block 186). Additionally, as described above, in some embodiments, a fastener 126 in a plug securement mechanism 125 may be secured within a fastener opening 128 via a (e.g., threaded) retainer 127, such as a nut or a cotter pin, secured (e.g., tightened) to an (e.g., threaded) end 129 of the fastener 126. Accordingly, in such embodiments, securing a plug securement mechanism 125 of a bore plug assembly 96 behind a (e.g., inflatable) plug of the bore plug assembly 96 may include inserting an (e.g., threaded) end 129 of a (e.g., threaded) fastener 126 through a fastener opening 128 and securing (e.g., tightening) a (e.g., threaded) retainer 127, such as a nut or a cotter pin, on the end 129 of the fastener 126 (process block 188).

Additionally, as described above, to facilitate distributing force more evenly across the diameter of a (e.g., inflatable) plug in a bore plug assembly 96 and, thus, reducing the likelihood of the plug rolling over a fastener 126 such that the plug inadvertently disengages from the tubing 22 of a flexible pipe 20, in some embodiments, a plug securement mechanism 125 in the bore plug assembly 96 may include a support plate 132. In particular, in such embodiments, a support plate 132 in a plug securement mechanism 125 of a bore plug assembly 96 may be disposed and, thus, secured between one or more fasteners 126 in the plug securement mechanism 125 and a plug of the bore plug assembly 96. Accordingly, in such embodiments, securing a plug securement mechanism 125 of a bore plug assembly 96 behind a (e.g., inflatable) plug of the bore plug assembly 96 may include inserting a support plate 132 into the pipe bore 32 of a flexible pipe 20 behind the plug (process block 190) and securing the support plate 132 between the plug and a (e.g., threaded) fastener 126 (process block 192).

Furthermore, as described above, to facilitate blocking a (e.g., inflatable) plug of a bore plug assembly 96 from inadvertently being pushed out of the pipe bore 32 of a flexible pipe 20, in some embodiments, a plug securement mechanism 125 in the bore plug assembly 96 may include a shackle 134. In particular, as described above, in such embodiments, a shackle 134 in a plug securement mechanism 125 of a bore plug assembly 96 may be secured to the tubing 22 of a flexible pipe 20 via a fastener 126 such that the shackle 134 partially extends into the pipe bore 32 of the flexible pipe 20 behind a plug of the bore plug assembly 96. Accordingly, in such embodiments, securing a plug securement mechanism 125 of a bore plug assembly 96 a (e.g., inflatable) plug of the bore plug assembly 96 may include securing a shackle 134 to the tubing 22 of a flexible pipe 20 via a fastener 126 such that the shackle 134 partially extends into the pipe bore 32 of the flexible pipe 20 (process block 194).

Moreover, as described above, to facilitate further reducing the likelihood of a (e.g., inflatable) plug in a bore plug assembly 96 being inadvertently disengaged from the tubing 22 of a flexible pipe 20, in some embodiments, the plug securement mechanism 125 in the bore plug assembly 96 may include multiple fasteners 126—namely at least a (e.g., first threaded) fastener 126A and another (e.g., second threaded and/or Mth threaded) fastener 126M. In particular, in such embodiments, the fastener 126A may be secured in a fastener opening 128A, which is formed through the tubing 22 of a flexible pipe 20, while the other fastener 126M may be secured in another fastener opening 128M, which is formed through the tubing 22 of the flexible pipe 20. Accordingly, in such embodiments, plugging an end of a pipe bore 32 in a flexible pipe 20 using a bore plug assembly 96 may include forming (e.g., implementing and/or drilling) another fastener opening 128M through the tubing 22 of the flexible pipe 20 behind a (e.g., inflatable) plug of the bore plug assembly 96 (process block 182) and securing a plug securement mechanism 125 of the bore plug assembly 96 behind a (e.g., inflatable) plug of the bore plug assembly 96 may include securing another (e.g., threaded) fastener 126 in the other fastener opening 128M such that the other fastener 126M extends into the pipe bore 32 of the flexible pipe 20 (process block 196).

In particular, as described above, in some such embodiments, a fastener opening 128A and another fastener opening 128M may be formed through the tubing 22 of a flexible pipe 20 such that corresponding fasteners 126, when secured therein, are spaced apart across the diameter of the pipe bore 32 of the flexible pipe 20 and, thus, a corresponding inflatable bladder 105 while the inflatable bladder 105 is in its more inflated state, for example, to facilitate increasing the amount of the inflatable bladder 105 that is supported by solid material and, thus, reducing the likelihood of the inflatable bladder 105 rolling over the fasteners 126 such that inflatable bladder 105 inadvertently disengages from the tubing 22 of the flexible pipe 20. However, as described above, in other such embodiments, a fastener opening 128A and another fastener opening 128M may be formed through the tubing 22 of a flexible pipe 20 such that corresponding fasteners 126, when secured therein, are offset along a longitudinal extent 42 of the pipe bore 32 in the flexible pipe 20, for example, to enable another fastener 126M secured in the other fastener opening 128M to act as a backup to a fastener 126A secured in the fastener opening 128A, thereby further reducing the likelihood of a corresponding inflatable bladder 105 being inadvertently pushed out of the pipe bore 32.

Additionally or alternatively, as described above, in some such embodiments, a fastener opening 128A and another fastener opening 128M may be formed through the tubing 22 of a flexible pipe 20 such that corresponding fasteners 126, when secured therein, are oriented in different (e.g., perpendicular and/or orthogonal) directions in the pipe bore 32 of the flexible pipe 20, for example, to enable another fastener 126M secured in the other fastener opening 128M to facilitate limiting axial movement of a corresponding inflatable bladder 105 around a fastener 126A secured in the fastener opening 128A and, thus, reducing the likelihood of the inflatable bladder 105 inadvertently being disengaged from the tubing 22 of the flexible pipe 20. In any case, in this manner, a bore plug assembly 96 in a pipe handling system 62 that includes an inflatable plug 102 may be operated to facilitate plugging an end of a pipe bore 32 in a flexible pipe 20 and, thus, elevating the fluid pressure within the pipe bore 32 of the flexible pipe 20, which, at least in some instances, may facilitate improving operational efficiency and/or operational reliability of a pipeline system 10, for example, due to the elevated fluid pressure within the pipe bore 32 of the flexible pipe 20 reducing the likelihood of the flexible pipe 20 having been inadvertently deformed (e.g., kinked and/or flatted) when deployed in the pipeline system 10.

Returning to the process 154 of FIG. 11, as described above, in some embodiments, an outboard bore plug assembly 98 in a pipe handling (e.g., deployment and/or transport) system 62 may include a bore fluid port 104, which extends through its inflatable bladder 105 such that the bore fluid port 104 can be fluidly connected to a pipe bore 32 in a flexible pipe 20. Accordingly, in such embodiments, plugging an outboard end 68 of the pipe bore 32 of a flexible pipe 20, which is formed into a pipe coil 46, using an outboard bore plug assembly 98 may include fluidly connecting a bore fluid port 104 of the outboard bore plug assembly 98 to the pipe bore 32 in the pipe coil 46 (process block 198). However, as described above, in other embodiments, a bore fluid port 104 may be separate (e.g., distinct) from the bore plug assemblies 96 in a pipe handling system 62, for example, instead being secured in a bore port opening 124 that is formed through the tubing 22 of a flexible pipe 20 such that it opens to the pipe bore 32 of the flexible pipe 20.

In any case, as described above, in some embodiments, a pipe handling system 62 may elevate the fluid pressure within the pipe bore 32 of a flexible pipe 20 to a target fluid pressure. To facilitate monitoring the fluid pressure within the pipe bore 32 of a flexible pipe 20 and, thus, achieving a target fluid pressure in the pipe bore 32, a bore fluid pressure sensor 107 may be fluidly connected to the pipe bore 32. For example, in some embodiments, a bore fluid pressure sensor 107 may be fluidly connected between a bore fluid port 104 and a bore pressurization fluid source 103 via one or more bore fluid conduits 101.

Additionally, as described above, after the inboard end 88 and the outboard end 68 of a pipe bore 32 in a pipe coil 46 are plugged, a pipe handling system 62 may pressurize the pipe bore 32 to an elevated fluid pressure, for example, to facilitate reducing the likelihood of flexible pipe 20 in the pipe coil 46 having inadvertent deformation (e.g., kinking and/or flattening). In other words, operating a pipe handling system 62 may generally include pressurizing a pipe bore 32 in a pipe coil 46 to an elevated fluid pressure (process block 160). To facilitate elevating the fluid pressure within a pipe bore 32, as described above, a pipe handling system 62 may include a bore fluid port 104, which opens to the pipe bore 32, and a bore pressurization fluid source 103, which can be fluidly connected to the bore fluid port 104 via one or more bore fluid conduits 101. Accordingly, pressurizing a pipe bore 32 in a pipe coil 46 may include supplying bore fluid, such as liquid and/or gas, from a bore pressurization fluid source 103 to a bore fluid port 104, which is fluidly connected to the pipe bore 32 in the pipe coil 46 (process block 200).

Furthermore, as described above, flexible pipe 20 may be deployed from a pipe coil 46 into a pipeline system 10 at least in part by unwinding the flexible pipe 20 from the pipe coil 46. To facilitate unwinding flexible pipe 20 from a pipe coil 46 that is loaded on pipe handling equipment 64, as described above, a pipe handling system 62 generally includes a pipe attachment 67, such as a pipe anchor or a pipe pull head, which is to be secured to an outboard (e.g., outer and/or free) end 68 of the flexible pipe 20. Accordingly, unwinding flexible pipe 20 from a pipe coil 46 for deployment in a pipeline system 10 may generally include securing a pipe attachment 67 to the outboard end 68 of the flexible pipe 20 (process block 202).

Moreover, as described above, in some embodiments, pipe handling equipment 64, such as a pipe deployment cradle frame or a pipe deployment A-frame, on which a pipe coil 46 is loaded may generally remain stationary while flexible pipe 20 is being deployed therefrom. In particular, in such embodiments, the pipe attachment 67 secured to the outboard end 68 of a flexible pipe 20 that is formed into a pipe coil 46 may be a pipe pull head, which can be secured to pulling equipment 72, such as a bulldozer or a tow truck, via one or more pulling cables 86. Accordingly, in such embodiments, unwinding flexible pipe 20 from a pipe coil 46 loaded on stationary pipe handling equipment may include moving (e.g., pulling and/or towing) a pipe attachment 67—namely a pipe pull head—and, thus, the outboard end 68 of the flexible pipe 20 away from the stationary pipe handling equipment 64 and, thus, the pipe coil 46 using pulling equipment 72 (process block 204).

However, as described above, in other embodiments, pipe handling equipment 64, such as a pipe handling vehicle (e.g., trailer), may include vehicle wheels 70 and, thus, may be mobile. In particular, in such embodiments, the pipe attachment 67 secured to the outboard end 68 of a flexible pipe 20 that is formed into a pipe coil 46 may be a pipe anchor, which can be used to facilitate fixing the location of the outboard end 68 of the flexible pipe 20 in place. Accordingly, in such embodiments, unwinding flexible pipe 20 from a pipe coil 46 loaded on mobile pipe handling equipment 64 may include moving (e.g., driving and/or towing) the pipe coil 46 away from a pipe attachment 67—namely a pipe anchor—and, thus, the outboard end 68 of the flexible pipe 20 using the mobile pipe handling equipment 64, for example, independently or with the assistance of pulling equipment 72 secured to the mobile pipe handling equipment 64 (process block 206).

In any case, elevating the fluid pressure with the pipe bore 32 of a flexible pipe 20 may generally increase the resistance the flexible pipe 20 exerts against inward deformation, such as kinking or flattening, of its tubing 22 and, thus, its pipe bore 32. Accordingly, unwinding flexible pipe 20 from a pipe coil 46 for deployment in a pipeline system 10 while the pipe bore 32 of the flexible pipe 20 is maintained (e.g., held) at an elevated fluid pressure may facilitate reducing the likelihood of the flexible pipe 20 kinking as it is being unwound from the pipe coil 46 and, thus, the likelihood of the flexible pipe 20 inadvertently limiting the operational efficiency and/or the operational reliability of the pipeline system 10.

In fact, to facilitate reducing the likelihood of flexible pipe 20 deployed from a pipe coil 46 into a pipeline system 10 having been inadvertently flattened and, thus, inadvertently limiting the operational efficiency and/or the operational reliability of the pipeline system 10, in some embodiments, a pipe handling system 62 may hold the pipe bore 32 of the flexible pipe 20 at an elevated fluid pressure even before the flexible pipe 20 is to be unwound from the pipe coil 46, for example, while the pipe coil 46 is in storage or being transported (e.g., moved over the road to pipeline system 10). In other words, in some such embodiments, operating a pipe handling system 62 may include moving (e.g., transporting) a pipe coil 46, for example, over the road via pipe handling equipment 64, such as a pipe handling vehicle (e.g., trailer), while a pipe bore 32 in the pipe coil 46 is held at an elevated fluid pressure (process block 168). In fact, in some such embodiments, a pipe handling system 62 may elevate a pipe bore 32 in a pipe coil 46 to different target fluid pressures at different times. For example, a pipe handling system 62 may hold a pipe bore 32 in a pipe coil 46 at a first target fluid pressure, which is between 14.7-43.8 pounds per square inch, while the pipe coil 46 is being transported over the road and at a second target fluid pressure, which is less than the first target fluid pressure (e.g., twenty pounds per square inch) or greater than the first target fluid pressure (e.g., fifty pounds per square inch or sixty pounds per square inch) while flexible pipe 20 is being unwound from the pipe coil 46.

Additionally, as described above, in some embodiments, the fluid pressure sealed within the pipe bore 32 of a flexible pipe 20 may vary with the fluid pressure within an inflatable bladder 105 of an inflatable plug 102 in a bore plug assembly 96 that is used to seal an end of the pipe bore 32. Merely as illustrative non-limiting example, plugging a pipe bore 32 using a bore plug assembly 96 that has its inflatable bladder 105 inflated to forty pounds per square inch may enable the pipe bore 32 to be held at a fluid pressure up to forty pounds per square inch, for example, due to inflatable bladder 105 allowing fluid pressure above forty pounds per square inch to escape from the pipe bore 32, thereby self-regulating the fluid pressure within the pipe bore 32. Accordingly, to facilitate monitoring the fluid pressure within a fluid cavity 106 in an inflatable bladder 105 of an inflatable plug 102 and, thus, achieving a target fluid pressure in a corresponding pipe bore 32, in some embodiments, an inflation fluid pressure sensor 118 may be fluidly connected to the fluid cavity 106, which, at least in some instances, may obviate a separate bore fluid pressure sensor 107. Merely as an illustrative non-limiting example, in some such embodiments, an inflation fluid pressure sensor 118 may be fluidly connected between an inflation fluid port 112 of an inflatable plug 102 and an inflation fluid source (e.g., pump) 114 via one or more inflation fluid conduits 116.

In any case, as described above, after flexible pipe 20 is unwound from a pipe coil 46, a pipe handling system 62 may de-pressurize the pipe bore 32 of the flexible pipe 20 before the flexible pipe 20 is deployed in a pipeline system 10. As described above, the pipe bore 32 of a flexible pipe 20 may be pressurized to an elevated fluid pressure by supplying inflation fluid to the pipe bore 32 via a bore fluid port 104 that opens to the pipe bore 32. Accordingly, depressurizing the pipe bore 32 of a flexible pipe 20 may generally include extracting (e.g., releasing) bore fluid from a bore fluid port 104 that opens to the pipe bore 32, for example, to a bore pressurization fluid source 103 or external environmental conditions (process block 208).

Additionally, as described above, in some instances, the entire length of a flexible pipe 20 that is formed into a pipe coil 46 may be continuously deployed in a pipeline system 10. In other words, in such embodiments, an inboard (e.g., inner) end 88 of a flexible pipe 20 may be unwound from a corresponding pipe drum 66, thereby freeing the inboard end 88 of the flexible pipe 20 from corresponding pipe handling equipment 64. As described above, to facilitate reducing the likelihood of the inboard end 88 of a flexible pipe 20 unwinding (e.g., springing back) from a corresponding pipe drum 66 in an uncontrolled manner, in some embodiments, a pipe handling system 62 may grab the flexible pipe 20 using pipe grabbing equipment 90, such as a pipe gripper or pipe grabber, before the inboard end 88 of the flexible pipe 20 is freed (e.g., unwound) from the pipe drum 66. Accordingly, in such embodiments, unwinding flexible pipe 20 from a pipe coil 46 may include grabbing the flexible pipe 20 using pipe grabbing equipment 90, such as a pipe gripper or pipe grabber, before the inboard end 88 of the flexible pipe 20 is freed (e.g., unwound) from a pipe drum 66 on which the pipe coil 46 is disposed (e.g., wrapped, spooled, and/or wound), for example, at a specific distance (e.g., ten feet or fifteen feet) away from the inboard end 88 of the flexible pipe 20 (process block 209).

However, as described above, in other instances, only a segment (e.g., section and/or portion) 78 of a flexible pipe 20, which is formed into a pipe coil 46, may be deployed from the pipe coil 46 into a pipeline system 10 at one time. In particular, as described above, to facilitate deploying a segment 78 of a flexible pipe 20 from a pipe coil 46, in some embodiments, a pipe handling system 62 may include a pipe cutter assembly 94, which can be used to cut the flexible pipe segment 78 off from the remainder of the flexible pipe 20. Accordingly, in such embodiments, operating a pipe handling system 62 may include cutting a segment 78 of a flexible pipe 20 off from the remainder of the flexible pipe 20 using a pipe cutter assembly 94, for example, after the flexible pipe segment 78 has been unwound from a corresponding pipe coil 46 (process block 170).

In any case, before deploying flexible pipe 20 into a pipeline system 10, the inboard end 88 and the outboard end 68 of the pipe bore 32 in the flexible pipe 20 may be unplugged (process block 166). As described above, a bore plug assembly 96 in a pipe handling system 62 may include an inflatable plug 102, which has an inflatable bladder 105 that defines a fluid cavity 106, and, thus, may facilitate plugging an (e.g., inboard or outboard) end of the pipe bore 32 in a flexible pipe 20 at least in part by expanding the inflatable bladder 105 radially outward such that the outer surface 108 of the inflatable bladder 105 is compressed circumferentially against and, thus, circumferentially engage with the inner surface 30 of the tubing 22 of the flexible pipe 20. Accordingly, in such embodiments, unplugging an end of a pipe bore 32 in a flexible pipe 20, which is plugged using a bore plug assembly 96 that includes an inflatable plug 102, may include contracting an inflatable bladder 105 of the inflatable plug 102 radially inward such that the outer surface 108 of the inflatable bladder 105 disengages from the inner surface 30 of the tubing 22 of the flexible pipe 20.

Figure 13:
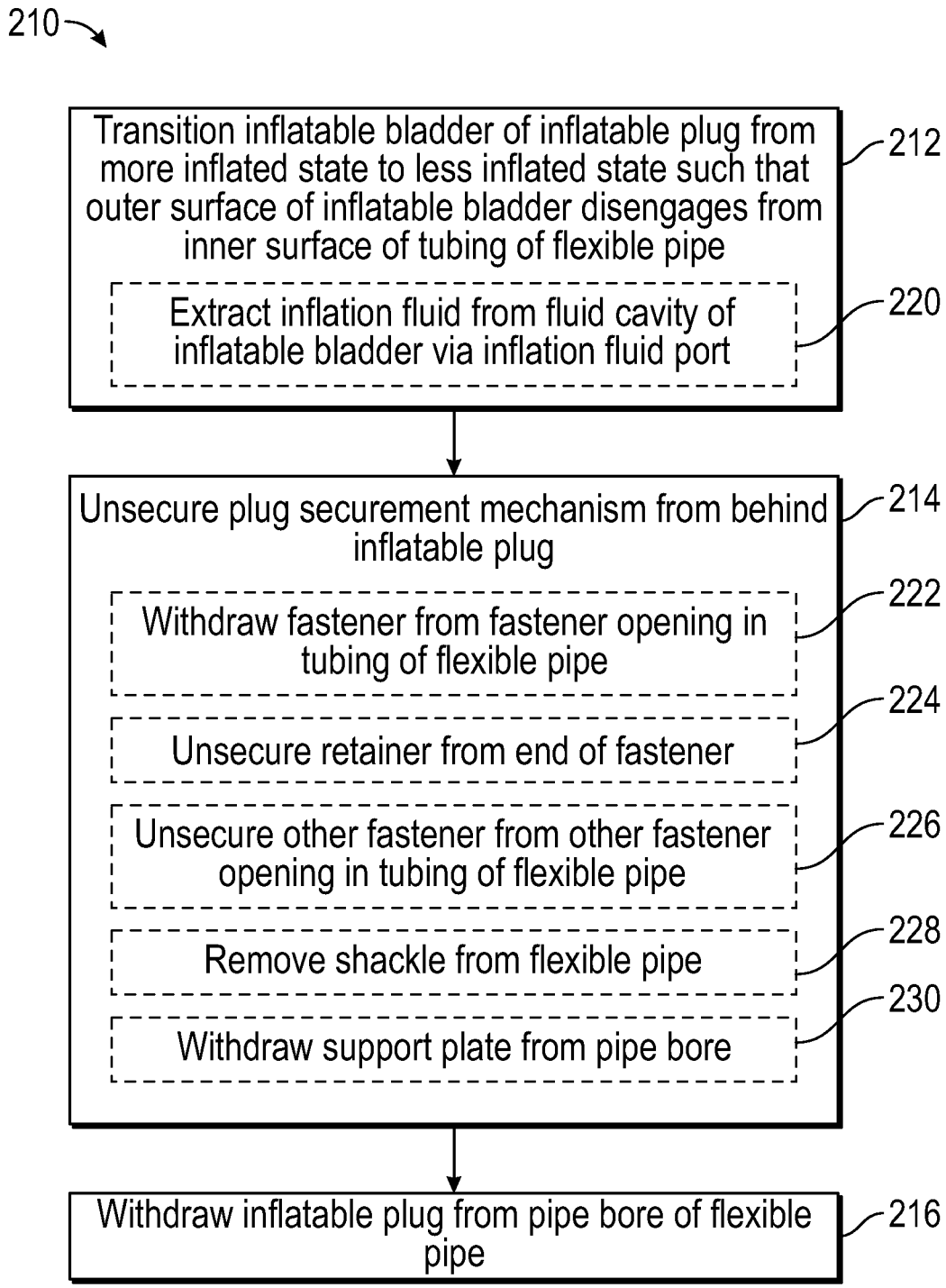
FIG. 13 is a flow diagram of an example of a process for operating a bore plug assembly to unplug an open end of a pipe bore, in accordance with an embodiment of the present disclosure.

To help further illustrate, an example of a process 210 for operating a (e.g., inboard or outboard) bore plug assembly 96 in a pipe handling system 62 to facilitate unplugging an end of a pipe bore 32 is described in FIG. 13. Generally, the process 210 includes transitioning an inflatable bladder of an inflatable plug from a more inflated state to a less inflated state such that an outer surface of the inflatable bladder disengages from the inner surface of tubing of a flexible pipe (process block 212). Additionally, the process 210 generally includes unsecuring a plug securement mechanism from behind the inflatable plug (process block 214) and withdrawing the inflatable plug from a pipe bore of the flexible pipe (process block 216).

Although specific process blocks are described in a specific order, which corresponds with an embodiment of the present disclosure, it should be appreciated that the example process 210 is merely intended to be illustrative and not limiting. In particular, in other embodiments, a process 210 for operating a bore plug assembly 96 to facilitate unplugging an end of a pipe bore 32 may omit one or more of the depicted process blocks and/or include one or more additional process blocks. Moreover, in other embodiments, one or more of the depicted process blocks may be performed in a different order, for example, such that the plug securement mechanism is unsecured before the inflatable bladder is transitioned from the more inflated state to the less inflated state.

In any case, as described above, to facilitate plugging an end of the pipe bore 32 in a flexible pipe 20, in some embodiments, a bore plug assembly 96 in a pipe handling system 62 may include an inflatable plug 102, which has an inflatable bladder 105 that defines a fluid cavity 106. In particular, in such embodiments, an inflatable bladder 105 of an inflatable plug 102 may generally expand radially outward when inflated from a less inflated (e.g., uninflated or partially inflated) state to a more (e.g., fully) inflated state and contract radially inward when deflated from the more inflated state to the less inflated state. Accordingly, operating a bore plug assembly 96 that includes an inflatable plug 102 to unplug an end of a pipe bore 32 in a flexible pipe 20 may generally include transitioning (e.g., deflating) an inflatable bladder 105 of the inflatable plug 102 from a more (e.g., fully) inflated state to a less inflated (e.g., partially inflated or uninflated) state such that the outer surface 108 of the inflatable bladder 105 disengages from inner surface 30 of the tubing 22 of the flexible pipe 20 (process block 212).

As described above, to facilitate supplying inflation fluid to and/or extracting inflation fluid from its fluid cavity 106 and, thus, controlling the inflation state of its inflatable bladder 105, an inflatable plug 102 in a bore plug assembly 96 additionally includes an inflation fluid port 112 that opens through its inflatable bladder 105 to its fluid cavity 106. Accordingly, in such embodiments, transitioning an inflatable bladder 105 from a more inflated state to a less inflated state may include extracting inflation fluid from the fluid cavity 106 of the inflatable bladder 105 via an inflation fluid port 104, for example, to an inflation fluid source 114 or external environmental conditions (process block 220).

Additionally, as described above, to facilitate blocking its (e.g., inflatable) plug from inadvertently being pushed out of the pipe bore 32 of a flexible pipe 20, in some embodiments, a bore plug assembly 96 in a pipe handling system 62 may additionally include a plug securement mechanism 125, which is to be secured to the tubing 22 of the flexible pipe 20 such that the plug securement mechanism 125 at least partially extends into the pipe bore 32 behind the plug. In particular, as described above, a plug securement mechanism 125 of a bore plug assembly 96 may generally include a (e.g., threaded) fastener 126, such as a bolt, a screw, or a pin, which is secured through a fastener opening 128 formed through the tubing 22 of a flexible pipe 20 such that the fastener 126 extends into the pipe bore 32 of the flexible pipe 20. Accordingly, unsecuring a plug securement mechanism 125 of a bore plug assembly 96 from a flexible pipe 20 may generally include withdrawing a (e.g., threaded) fastener 126 from a fastener opening 128 in the tubing 22 of the flexible pipe 20 such that the fastener 126 is no longer disposed in the pipe bore 32 of the flexible pipe 20 behind a (e.g., inflatable) plug of the bore plug assembly 96 (process block 222).

In particular, as described above, in some embodiments, a (e.g., threaded) fastener 126 in a plug securement mechanism 125 may be secured in fastener opening 128 at least in part by inserting an (e.g., threaded) end 129 of the fastener 126 through the fastener opening 128 and securing (e.g., tightening) a (e.g., threaded) retainer 127, such as nut or cotter pin, on the end 129 of the fastener 126. Accordingly, to facilitate withdrawing a fastener 126 of a plug securement mechanism 125 from a corresponding fastener opening 128, in such embodiments, unsecuring a plug securement mechanism 125 of a bore plug assembly 96 from a flexible pipe 20 may include unsecuring (e.g., loosening) a (e.g., threaded) retainer 127, such as a nut or a cotter pin, from an (e.g., threaded) end 129 of a fastener 126 (process block 224).

Additionally, as described above, in some embodiments, a plug securement mechanism 125 of a bore plug assembly 98 may include multiple fasteners 126—namely a (e.g., first threaded) fastener 126A, which is secured in a (e.g., first) fastener opening 128A in the tubing 22 of a flexible pipe 20, and another (e.g., second threaded or Mth threaded) fastener 126M, which is secured in another (e.g., second or Mth) fastener opening 128M in the tubing 22 of the flexible pipe 20. Accordingly, in such embodiments, unsecuring a plug securement mechanism 125 of a bore plug assembly 96 from a flexible pipe 20 may additionally include unsecuring another (e.g., threaded) fastener 126M from another fastener opening 128M in the tubing 22 of the flexible pipe 20, for example, at least in part by unsecuring another (e.g., threaded) retainer 127 from an (e.g., threaded) end 129 of the other fastener 126M and withdrawing the other fastener 126M from the other fastener opening 128M (process block 226).

Furthermore, as described above, to facilitate blocking a (e.g., inflatable) plug of a bore plug assembly 96 from inadvertently being pushed out of the pipe bore 32 of a flexible pipe 20, in some embodiments, a plug securement mechanism 125 in the bore plug assembly 96 may include a shackle 134, which is secured to the tubing 22 of the flexible pipe 20 via a fastener 126 such that the shackle 134 partially extends into the pipe bore 32 of the flexible pipe 20 behind the plug. Accordingly, in such embodiments, unsecuring a plug securement mechanism 125 of a bore plug assembly 96 from a flexible pipe 20 may include removing a shackle 134 from the flexible pipe 20, for example, at least in part by unsecuring a (e.g., threaded) fastener 126 from the shackle 134 and a corresponding fastener opening 128 in the tubing 22 of the flexible pipe 20 (process block 228).

Moreover, as described above, to facilitate distributing force across the diameter of a (e.g., inflatable) plug in a bore plug assembly 96 more uniformly and, thus, reducing the likelihood of the plug rolling over a fastener 126 such that the plug inadvertently disengages from the tubing 22 of a flexible pipe 20, in some embodiments, a plug securement mechanism 125 in the bore plug assembly 96 may include a support plate 132, which is secured between the fastener 126 and the plug. Accordingly, in such embodiments, unsecuring a plug securement mechanism 125 of a bore plug assembly 96 from a flexible pipe 20 may include withdrawing a support plate from the pipe bore 32 of the flexible pipe 20, for example, after a fastener 126 is removed from behind the support plate 132 (process block 230).

In any case, after a plug securement mechanism 125 of a bore plug assembly 96 is unsecured from a flexible pipe 20 such that the plug securement mechanism 125 is no longer disposed behind an inflatable plug 102 in the bore plug assembly 96, the inflatable plug 102 may be withdrawn from the pipe bore 32 while its inflatable bladder 105 is maintained in its less inflated state, thereby unplugging a corresponding end of the pipe bore 32 (process block 216). In particular, in some embodiments, an inflatable plug 102 in a (e.g., inboard or outboard) bore plug assembly 96 may be withdrawn from a pipe bore 32 at least in part by pulling on an inflation fluid port 112 of the inflatable plug 102. Additionally or alternatively, in some embodiments, an inflatable plug 102 in an outboard bore plug assembly 98 may be withdrawn from a pipe bore 32 at least in part by pulling on a bore fluid port 104 of the inflatable plug 102. In any case, in this manner, a bore plug assembly 96 in a pipe handling system 62 that includes an inflatable plug 102 may be operated to facilitate unplugging an end of a pipe bore 32 in a flexible pipe 20, for example, after the bore plug assembly 96 is used to plug the end of the pipe bore 32 to facilitate elevating the fluid pressure within the pipe bore 32, which, at least in some instances, may facilitate improving operational efficiency and/or operational reliability of a pipeline system 10, for example, due to the elevated fluid pressure within the pipe bore 32 of the flexible pipe 20 reducing the likelihood of inadvertently deformed (e.g., kinked and/or flattened) flexible pipe 20 being deployed in the pipeline system 10.

Returning to the process 154 of FIG. 11, as described above, a plug securement mechanism 125 in a bore plug assembly 96 may be secured to a flexible pipe 20 via one or more fastener openings 128 formed through the tubing 22 of the flexible pipe 20. Accordingly, in some embodiments, a fastener opening 128 in the tubing 22 of a flexible pipe 20 may be cut off from the remainder of the flexible pipe 20 before the flexible pipe 20 is deployed in a pipeline system 10. In other words, in such embodiments, operating a pipe handling system 62 may include cutting one or more fastener openings 128 in a flexible pipe 20 off from the remainder of the flexible pipe 20, for example, via a pipe cutter assembly 94 (process block 171). However, in other embodiments, a fastener opening 128 in a flexible pipe 20 may not be cut off from the flexible pipe 20 before the flexible pipe 20 is deployed in a pipeline system 10, for example, when a corresponding pipe fitting 18 in the pipeline system 10 is expected to cover the fastener opening 128 (e.g., via its fitting jacket) when the flexible pipe 20 is secured and sealed in the pipe fitting 18. In any case, in this manner, the present disclosure provides techniques for implementing and/or operating a pipe handling system 62, which includes a pair of bore plug assemblies 96, to facilitate reducing the likelihood of inadvertently deformed (e.g., kinked and/or flattened) flexible pipe 20 being deployed in a pipeline system 10, which, at least in some instances, may facilitate improving operational efficiency and/or operational reliability of the pipeline system 10.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe handling system comprising:
an inboard bore plug assembly configured to facilitate plugging an inboard end of a pipe bore in a flexible pipe that is formed into a pipe coil, wherein the inboard bore plug assembly comprises: a first inflatable plug having:
a first inflatable bladder that defines a first fluid cavity and a first inflation port opening that opens to the first fluid cavity;
a first inflation fluid port secured within the first inflation port opening such that the first inflation fluid port opens to the first fluid cavity; and
a first plug securement mechanism, wherein the first plug securement mechanism comprises a first threaded fastener configured to be secured in a first fastener opening formed through tubing of the flexible pipe such that the first threaded fastener extends into the pipe bore of the flexible pipe behind the first inflatable plug of the inboard bore plug assembly; and
an outboard bore plug assembly configured to facilitate plugging an outboard end of the pipe bore in the flexible pipe, wherein the outboard bore plug assembly comprises a second inflatable plug having:
a second inflatable bladder that defines a second fluid cavity, a second inflation port opening that opens to the second fluid cavity, and a bore port opening that extends through the second inflatable bladder; and
a second inflation fluid port secured within the second inflation port opening such that the second inflation fluid port opens to the second fluid cavity;
a bore fluid port secured in the bore port opening such that the bore fluid port extends through the second inflatable plug to enable the pipe bore in the flexible pipe to be pressurized to an elevated fluid pressure at least while the flexible pipe is being unwound from the pipe coil; and
a second plug securement mechanism, wherein the second plug securement mechanism comprises a second threaded fastener configured to be secured in a second fastener opening formed through the tubing of the flexible pipe such that the second threaded fastener extends into the pipe bore of the flexible pipe behind the second inflatable plug of the outboard bore plug assembly.

2. The pipe handling system of claim 1, comprising:
a pipe anchor configured to be secured to a free end of the flexible pipe to facilitate holding the free end of the flexible pipe in place; and
a pipe handling vehicle, wherein the pipe handling vehicle is configured to:
enable the pipe coil to be loaded thereon; and
move the pipe coil away from the pipe anchor to facilitate unwinding more of the flexible pipe from the pipe coil.

3. The pipe handling system of claim 2, comprising pulling equipment, wherein:
the pipe handling vehicle comprises vehicle wheels and a tongue assembly; and
the pulling equipment comprises a hitch assembly configured to be interlocked with the tongue assembly on the pipe handling vehicle to enable the pulling equipment to move the pipe handling vehicle.

4. The pipe handling system of claim 2, wherein the pipe handling vehicle is configured to move the pipe coil over a road while the pipe bore in the flexible pipe is maintained at the elevated fluid pressure or a different elevated fluid pressure.

5. The pipe handling system of claim 4, wherein the pipe handling system is configured to:
maintain the pipe bore at the elevated fluid pressure while the pipe handling vehicle is unwinding the flexible pipe from the pipe coil; and
maintain the pipe bore at the different elevated fluid pressure while the pipe handling vehicle is moving the pipe coil over the road.

6. The pipe handling system of claim 1, comprising:
stationary pipe handling equipment configured to enable the pipe coil to be loaded thereon;
a pipe pull head configured to be secured to a free end of the flexible pipe; and
pulling equipment configured to be secured to the pipe pull head to enable the pulling equipment to pull the pipe pull head away from the stationary pipe handling equipment to facilitate unwinding more of the flexible pipe from the pipe coil.

7. The pipe handling system of claim 1, comprising:
pipe handling equipment configured to enable the pipe coil to be loaded thereon;
a pipe drum, wherein the pipe coil is configured to be disposed around the pipe drum when the pipe coil is loaded on the pipe handling equipment; and
pipe grabbing equipment configured to grab onto the flexible pipe before the flexible pipe is freed from the pipe drum.

8. The pipe handling system of claim 1, wherein:
the first inflatable bladder of the first inflatable plug is configured to:
expand radially outward when inflation fluid is supplied to the first fluid cavity in the first inflatable plug via the first inflation fluid port of the first inflatable plug; and
contract radially inward when inflation fluid is extracted from the first fluid cavity in the first inflatable plug via the first inflation fluid port of the first inflatable plug; and
the second inflatable bladder of the second inflatable plug is configured to:
expand radially outward when inflation fluid is supplied to the second fluid cavity in the second inflatable plug via the second inflation fluid port of the second inflatable plug; and
contract radially inward when inflation fluid is extracted from the second fluid cavity in the second inflatable plug via the second inflation fluid port of the second inflatable plug.

9. The pipe handling system of claim 1, wherein:
the inboard bore plug assembly is configured to circumferentially compress a first outer surface of the first inflatable bladder in the first inflatable plug against an inner surface of tubing of the flexible pipe to facilitate plugging the inboard end of the pipe bore when the first inflatable bladder is transitioned from a first less inflated state to a first more inflated state; and
the outboard bore plug assembly is configured to circumferentially compress a second outer surface of the second inflatable bladder in the second inflatable plug against the inner surface of the tubing of the flexible pipe to facilitate plugging the outboard end of the pipe bore when the second inflatable bladder is transitioned from a second less inflated state to a second more inflated state.

10. A method of handling flexible pipe that is formed into a pipe coil, comprising:
plugging an inboard end of a pipe bore of the flexible pipe using an inboard bore plug assembly at least in part by:
supplying inflation fluid to a first inflatable bladder in a first inflatable plug of the inboard bore plug assembly to transition the first inflatable bladder from a first less inflated state to a first more inflated state such that a first outer surface of the first inflatable bladder is circumferentially compressed against an inner surface of tubing of the flexible pipe; and
securing a first threaded fastener in a first fastener opening formed through tubing of the flexible pipe such that the first threaded fastener extends into the pipe bore of the flexible pipe behind the first inflatable plug;
plugging an outboard end of the pipe bore of the flexible pipe using an outboard bore plug assembly at least in part by:
supplying inflation fluid to a second inflatable bladder in a second inflatable plug of the outboard bore plug assembly to transition the second inflatable bladder from a second less inflated state to a second more inflated state such that a second outer surface of the second inflatable bladder is circumferentially compressed against the inner surface of the tubing of the flexible pipe, wherein the second inflatable bladder defines a bore port opening and the outboard bore plug assembly comprises a bore fluid port secured in the bore port opening such that the bore port opening extends through the second inflatable bladder; and
securing a second threaded fastener in a second fastener opening formed through the tubing of the flexible pipe such that the second threaded fastener extends into the pipe bore of the flexible pipe behind the second inflatable plug; and
supplying bore fluid to the pipe bore of the flexible pipe via the bore fluid port that extends through the second inflatable bladder of the outboard bore plug assembly to facilitate maintaining fluid pressure within the pipe bore elevated at least while the flexible pipe is being unwound from the pipe coil.

11. The method of claim 10, wherein:
supplying inflation fluid to the first inflatable bladder in the first inflatable plug of the inboard bore plug assembly comprises supplying inflation fluid from an inflation fluid source to a first inflation fluid port of the first inflatable plug that opens through the first inflatable bladder to a first fluid cavity defined by the first inflatable bladder; and
supplying inflation fluid to the second inflatable bladder in the second inflatable plug of the outboard bore plug assembly comprises supplying inflation fluid from the inflation fluid source to a second inflation fluid port of the second inflatable plug that opens through the second inflatable bladder to a second fluid cavity defined by the second inflatable bladder.

12. The method of claim 10, comprising:
loading the pipe coil on a pipe handling vehicle; and
transporting, using the pipe handling vehicle, the pipe coil over a road while fluid pressure within the pipe bore is maintained at an elevated fluid pressure.

13. The method of claim 12, comprising:
securing a pipe anchor to a free end of the flexible pipe to facilitate securing the free end of the flexible pipe in place; and
moving, using the pipe handling vehicle, the pipe coil away from the pipe anchor to facilitate unwinding more of the flexible pipe from the pipe coil.

14. The method of claim 13, wherein
transporting the pipe coil over the road comprises transporting the pipe coil over the road while fluid pressure within the pipe bore is maintained at a first target fluid pressure; and
moving the pipe coil away from the pipe anchor comprises unwinding more of the flexible pipe from the pipe coil while fluid pressure within the pipe bore is maintained at a second target fluid pressure that is different from the first target fluid pressure.

15. The method of claim 10, comprising:
loading the pipe coil on stationary pipe deployment equipment;
securing a pipe pull head to a free end of the flexible pipe;
securing pulling equipment to the pipe pull head via one or more pulling cables; and
moving, using the pulling equipment, the pipe pull head away from the stationary pipe deployment equipment to facilitate unwinding more of the flexible pipe from the pipe coil.

16. A bore plug assembly, comprising:
an inflatable plug, wherein the inflatable plug comprises:
an inflatable bladder that defines a fluid cavity and an inflation port opening that opens to the fluid cavity; and
an inflation fluid port secured within the inflation port opening in the inflatable bladder such that the inflation fluid port opens to the fluid cavity to enable the inflatable bladder to be inflated to facilitate plugging an end of a pipe bore in a flexible pipe; and
a plug securement mechanism, wherein the plug securement mechanism comprises:
a threaded fastener configured to be secured in a fastener opening that is formed through tubing of the flexible pipe such that the threaded fastener extends into the pipe bore of the flexible pipe behind the inflatable plug to facilitate blocking the inflatable plug from inadvertently being pushed out of the end of the pipe bore when fluid pressure within the pipe bore is elevate; and
a shackle configured to be secured to the flexible pipe via the threaded fastener such the shackle at least partially extends into the pipe bore of the flexible pipe behind the inflatable plug.

17. The bore plug assembly of claim 16, wherein:
the inflatable bladder of the inflatable plug defines a bore port opening that extends therethrough; and
the inflatable plug comprises a bore fluid port secured in the bore port opening such that the bore fluid port extends through the inflatable bladder of the inflatable plug to facilitate controlling fluid pressure within the pipe bore of the flexible pipe.

18. The bore plug assembly of claim 16, wherein:
the threaded fastener in the plug securement mechanism is configured to be secured in the fastener opening in the tubing of the flexible pipe such that the threaded fastener extends into the pipe bore of the flexible pipe in a first direction; and
the plug securement mechanism comprises another threaded fastener configured to be secured in another fastener opening that is formed through the tubing of the flexible pipe such that the another threaded fastener extends into the pipe bore of the flexible pipe in a second direction that is different from the first direction, wherein the fastener opening and the another fastener opening are offset along a longitudinal extent of the pipe bore.

\* \* \* \* \*